US008689118B2

(12) United States Patent
Hieb et al.

(10) Patent No.: US 8,689,118 B2
(45) Date of Patent: Apr. 1, 2014

(54) METHODS AND APPARATUS TO CONCEAL PORTIONS OF A VISUAL OBJECT DIAGRAM IN A PROCESS CONTROL SYSTEM

(75) Inventors: Brandon Hieb, Cedar Park, TX (US); Gary Keith Law, Georgetown, TX (US); David R. Denison, Austin, TX (US); Cheyenne Hernandez, New Manila Quezon (PH)

(73) Assignee: Fisher-Rosemount Systems, Inc., Round Rock, TX (US)

( * ) Notice: Subject to any disclaimer, the term of this patent is extended or adjusted under 35 U.S.C. 154(b) by 1202 days.

(21) Appl. No.: 12/467,806

(22) Filed: May 18, 2009

(65) Prior Publication Data
US 2010/0293495 A1  Nov. 18, 2010

(51) Int. Cl.
*G06F 3/048* (2013.01)
*G05B 15/00* (2006.01)

(52) U.S. Cl.
USPC ............... 715/762; 715/771; 715/772

(58) Field of Classification Search
USPC ................................. 715/762, 771
See application file for complete search history.

(56) References Cited

U.S. PATENT DOCUMENTS

| 5,504,917 A | 4/1996 | Austin |
| 5,971,581 A | 10/1999 | Gretta et al. |
| 2006/0158044 A1 | 7/2006 | Koehler et al. |
| 2007/0146491 A1* | 6/2007 | Tremblay et al. ........ 348/211.99 |
| 2008/0250347 A1* | 10/2008 | Gray et al. .................... 715/808 |

FOREIGN PATENT DOCUMENTS

| EP | 0389132 | 9/1990 |
| EP | 2124114 | 11/2009 |
| WO | 9106050 | 5/1991 |

OTHER PUBLICATIONS

European Patent Office, "Extended European Search Report", issued in connection with European Patent Application No. 10162959.0, Oct. 12, 2011, (6 pages).
UK Intellectual Property Office, "Examination Report under Section 18(3)," issued in connection with Application No. GB1007025.8, Oct. 28, 2013, 3 pages.

* cited by examiner

*Primary Examiner* — Andrea Leggett
(74) *Attorney, Agent, or Firm* — Hanley, Flight & Zimmerman, LLC

(57) ABSTRACT

Example methods and apparatus to conceal portions of a visual object diagram in a process control system are disclosed. A disclosed example method includes receiving a selection to conceal a first functional block within a visual object diagram, wherein the first functional block is associated with a first view parameter, determining a link from a process control parameter within the first functional block to a first intersection within a second functional block within the visual object diagram, wherein the link is associated with a second view parameter, coupling the first view parameter and the second view parameter to the first intersection, and concealing the link and the first functional block.

25 Claims, 11 Drawing Sheets

METHODS AND APPARATUS TO CONCEAL PORTIONS OF A VISUAL OBJECT DIAGRAM IN A PROCESS CONTROL SYSTEM

FIELD OF THE DISCLOSURE

The present disclosure relates generally to process control systems and, more particularly, to methods and apparatus to conceal portions of a visual object diagram in a process control system.

BACKGROUND

Process control systems, like those used in chemical, petroleum or other processes, typically include one or more process controllers and input/output (I/O) devices communicatively coupled to at least one host or operator workstation and to one or more field devices via analog, digital or combined analog/digital buses. The field devices, which may be, for example, valves, valve positioners, switches and transmitters (e.g., temperature, pressure and flow rate sensors), perform process control functions within the process such as opening or closing valves and measuring process control parameters. The process controllers receive signals indicative of process measurements made by the field devices, process this information to implement a control routine, and generate control signals that are sent over the buses or other communication lines to the field devices to control the operation of the process. In this manner, the process controllers may execute and coordinate control strategies using the field devices via the buses and/or other communication links communicatively coupling the field devices.

Information from the field devices and the controllers may be made available to one or more applications (i.e., software routines, programs, etc.) executed by the operator workstation (e.g., a processor-based system) to enable an operator to perform desired functions with respect to the process, such as viewing the current state of the process (e.g., via a graphical user interface), evaluating the process, modifying the operation of the process (e.g., via a visual object diagram), etc. Many process control systems also include one or more application stations. Typically, these application stations are implemented using a personal computer, workstation, or the like that is communicatively coupled to the controllers, operator workstations, and other systems within the process control system via a local area network (LAN). Each application station may execute one or more applications that perform campaign management functions, maintenance management functions, virtual control functions, diagnostic functions, real-time monitoring functions, safety-related functions, configuration functions, etc. within the process control system.

Process control systems typically include one or more operator terminals and/or application stations. These operator terminals and/or applications stations include one or more graphical interfaces to enable system operators to view current process-related algorithm information that may include functions and/or parameters, statistical information, historical process information, alarm information, campaign management information, execution information or, more generally, information provided by any or all of the applications associated with the process control system.

System designers or engineers create process control graphics to display process control information to system operators. This process control information may include process control parameter information and/or process control functions. For example, a process control visual object diagram may include a plurality of functional blocks, embedded composite objects, steps, and/or any other graphical object associated with portions of a process control system.

SUMMARY

Example methods and apparatus to conceal portions of a visual object diagram in a process control system are described. In one example, a method includes receiving a selection to conceal a first functional block within a visual object diagram, where the first functional block is associated with a first view parameter. The example method further includes determining a link from a process control parameter within the first functional block to a first intersection within a second functional block within the visual object diagram, where the link is associated with a second view parameter. Additionally, the example method includes coupling the first view parameter and the second view parameter to the first intersection and concealing the link and the first functional block.

An example apparatus includes a functional block manager to determine a link from a process control parameter within a first functional block selected to be concealed to a first intersection within a second functional block within a visual object diagram, where the first functional block is associated with a first view parameter and the link is associated with a second view parameter. Additionally, the example functional block manager conceals the link and the first functional block. Furthermore, the example apparatus includes a view parameter manager to couple the first view parameter and the second view parameter to the first intersection.

DETAILED DESCRIPTION

Figure 1:
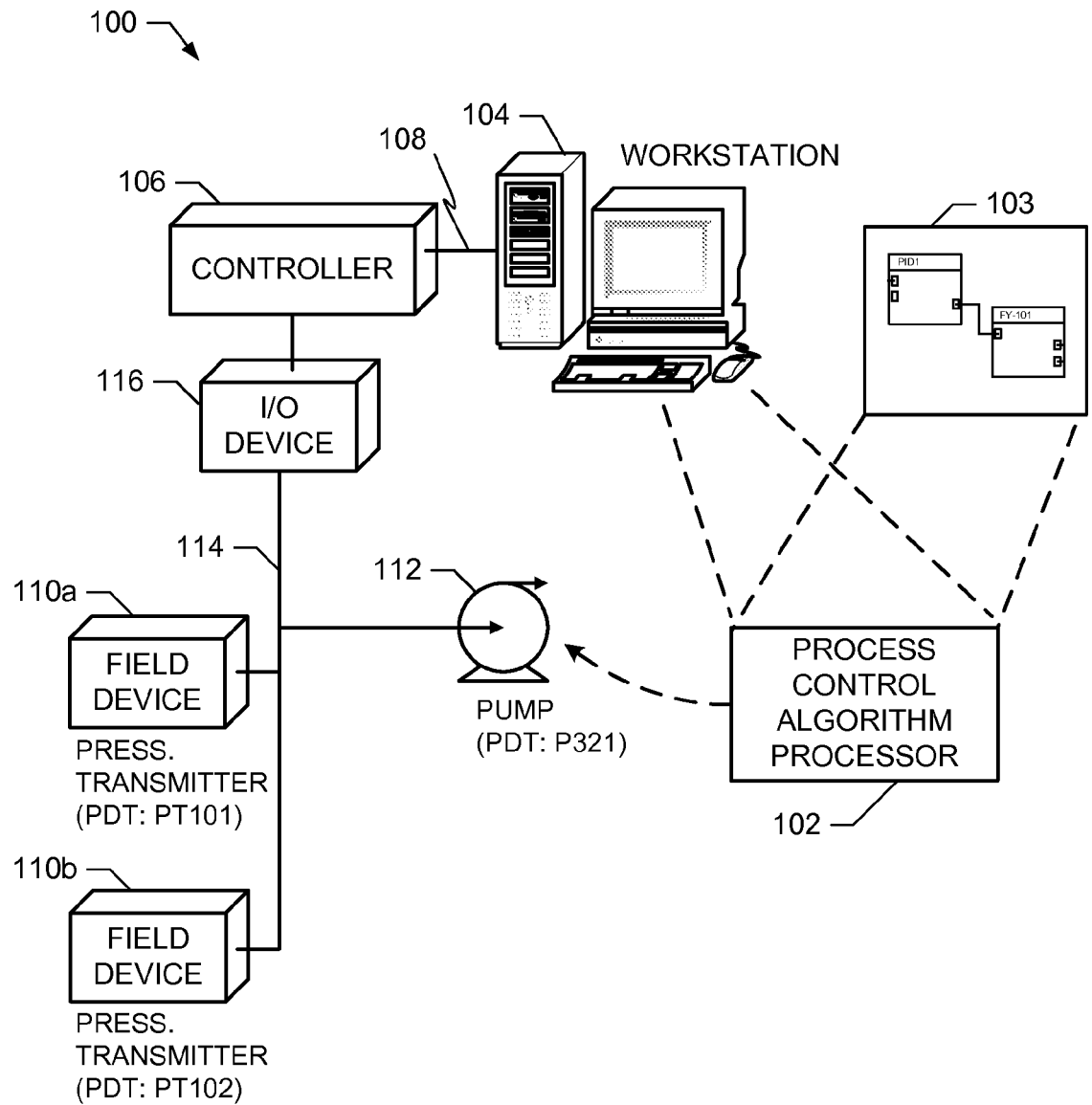
FIG. 1 is a block diagram illustrating an example process control system including an example process control algorithm processor.

Although the following describes example methods and apparatus including, among other components, software and/or firmware executed on hardware, it should be noted that these examples are merely illustrative and should not be considered as limiting. For example, it is contemplated that any or all of the hardware, software, and firmware components could be embodied exclusively in hardware, exclusively in software, or in any combination of hardware and software. Accordingly, while the following describes example methods and apparatus, persons of ordinary skill in the art will readily appreciate that the examples provided are not the only way to implement such methods and apparatus.

In general, the example methods and apparatus described herein may be used within a visual object diagram user interface environment associated with a process control system. One or more visual object diagram(s) may be used by a variety of personnel associated with the configuration and/or operation of a process control system. More specifically, the example visual object diagram user interface described herein may be used to control and/or configure one or more process control applications such as, for example, process monitoring applications, alarm management applications, process trending and/or history applications, batch processing applications, campaign management applications, statistical applications, streaming video applications, advanced control applications, etc.

More generally, the example visual object diagram user interface described herein may be used to host applications associated with the development, deployment, configuration, design, customization, operation, maintenance, and/or support of a process control system. Personnel such as, for example, information technology personnel, configuration engineers, system operators, technical support engineers, software development engineers, test engineers, etc. may utilize various aspects of the example visual object diagram user interface described herein to control and configure control elements of a process control system A visual object diagram may include functional blocks, embedded composite objects, steps, and/or any other visual object diagram objects that may be used as a display representation for one or more process control routine(s) and/or algorithm(s). A development group may create process control algorithms using control systems such, for example, as the DeltaV™ control system sold by Fisher-Rosemount Systems, Inc., an Emerson Process Management company.

A process control algorithm (e.g., a process or routine) controls a process control system via one or more process controllers by processing inputs from field devices (e.g., valves, valve positioners, switches, transmitters, temperature, pressure and flow rate sensors, etc.), calculating one or more control actions based on the inputs, and generating outputs to actuate the field devices based on the calculated control actions. A process control algorithm may be represented as one or more interconnected functional blocks. The functional blocks may be arranged and/or interconnected to correspond to the operations and flow of information within a process control algorithm. Each functional block may be defined to implement one or more process control functions and/or applications. For example, functional blocks may receive inputs from a process control system, generate outputs for the process control system, calculate parameters based on process control inputs and/or parameters, monitor inputs and/or parameters, store inputs and/or parameters, and/or calculate control actions.

The output from a functional block is typically transmitted via a link (e.g., a communication path) to an input of another functional block. Each input and/or output may correspond to an input and/or an output from one or more field devices. Additionally, the input and/or the output may be an intermediate value corresponding to one or more calculations and/or manipulations associated with the functional blocks.

The example visual object diagram user interface manages and/or displays functional blocks and their interconnections within a display (e.g., a monitor) of a workstation coupled to the process control system. An operator may modify a process control algorithm by changing, moving, adding, redefining, deleting, and/or connecting functional blocks via a mouse, keyboard, and/or any other input device. For example, a control loop may be created within a process control algorithm by coupling an output of a proportional-integral-derivative (PID) functional block to the input of a control calculation functional block and coupling the feedback output of the control calculation functional block to the PID functional block.

Functional blocks include, are coupled to, and/or are associated with view parameters that specify graphical information describing how each functional block is to be displayed. Additionally, the functional blocks include, are coupled to, and/or are associated with data parameters that specify the data sources for each of the functional blocks. The data sources may include data generated by field devices, other process control equipment, and/or other functional blocks. Furthermore, functional blocks include process control parameters that specify inputs and/or outputs of each functional block. The process control parameters within the functional blocks may be referred to as intersections because these process control parameters define the nodes (e.g., an intersect) at which the functional blocks receive and/or transmit data to other coupled functional blocks. Additionally, links that couple together functional blocks include view parameters that specify how each link is displayed. The links may also include data parameters that specify the endpoints for the links. For example, a link connecting or coupling an output parameter of a first functional block to an input parameter of a second functional block may include references in an associated data parameter to the output and input parameters of the functional blocks. Additionally, the view parameter associated with the link may include references to the intersection of the output parameter of first functional block and the input parameter of the second functional block. As a result of the references within the view parameter, the link is displayed as coupling together the intersections of the first and second functional blocks.

Typical process control strategies are based on process control algorithms that correspond to a relatively large number of interconnected functional blocks. These interconnected functional blocks may be displayed within a workstation display. The large number of functional blocks and complex interconnections may provide a challenge for a process control operator to isolate and/or modify a small set of the functional blocks. For example, if the operator attempts to debug and/or rearrange some of the functional blocks, the other functional blocks may create confusion and/or lead to the possibility of an improper or missing connection.

The example methods and apparatus described herein may be used to conceal specified functional blocks (e.g., visual objects within a visual object diagram) to enable process control operators to more efficiently and effectively modify desired functional blocks. Each functional block includes a key parameter that defines the relationship of the functional block to a coupled functional block. The coupled functional block may be a parent functional block within a hierarchical structure such that when a selected functional block is concealed, it is coupled to its specified parent functional block via the key parameter.

When a functional block is selected to be concealed, the example methods and apparatus described herein may determine a key parameter for the selected functional block. The example methods and apparatus may then determine a link from the key parameter to an intersection within a coupled functional block (e.g., a parent functional block). The example methods and apparatus may couple a view parameter associated with the selected functional block and a view parameter associated with the link to a view parameter associated with the adjacent functional block. Then, if the selected functional block does not include other process control parameters, the example methods and apparatus may conceal the link and the selected functional block.

In examples where the selected functional block includes other process control parameters, the example methods and apparatus described herein determine links associated with the other process control parameters. The example methods and apparatus may then determine if these links also correspond to the parent functional block, other functional blocks to be concealed, or functional blocks that are not specified to be concealed. The example methods and apparatus may then determine key parameters and links for other functional blocks that are to be concealed and repeat these operations until all of the specified functional blocks are concealed.

FIG. 1 is a block diagram showing an example process control system 100 including an example process control algorithm processor 102. The process control algorithm processor 102 manages and/or processes a visual object diagram 103 that may be displayed within a workstation 104 (e.g., an application station, an operator station, etc.). The workstation 104 is communicatively coupled to a process control controller 106 via a local area network (LAN) 108 (e.g., an application control network (ACN). In this example, the process control algorithm processor 102 is implemented within the workstation 104. Alternatively or additionally, the process control algorithm processor 102 may be included within the controller 106 to manage and/or operate process control algorithm routines.

The workstation 104 may be configured to perform operations associated with one or more information technology applications, user-interactive applications, and/or communication applications. For example, the workstation 104 may be configured to perform operations associated with process control-related applications and communication applications that enable the workstation 104 and the controller 106 to communicate with other devices or systems using any desired communication media (e.g., wireless, hardwired, etc.) and protocols (e.g., HTTP, SOAP, etc.). The workstation 104 may also be configured to create, manage, and/or modify process control processes within a graphical interface from the parameters and/or functions of a process control algorithm routine. The workstation 104 may be implemented using any suitable computer system or processing system (e.g., the processor system 900 of FIG. 9). For example, the workstation 104 could be implemented using a single processor personal computer, single or multi-processor workstations, etc.

The LAN 108 that couples the workstation 104 to the controller 106 may be implemented using any desired communication medium and protocol. For example, the LAN 108 may be based on a hardwired or wireless Ethernet communication scheme. However, any other suitable communication medium and protocol could be used. Furthermore, although a single LAN is shown, more than one LAN and appropriate communication hardware within the workstation 104 may be used to provide redundant communication paths between the workstation 104 and a respective similar workstation (not shown).

In the example process control system 100 of FIG. 1, the example workstation 104 provides a process control operator access to view and/or modify process control data processed by the controller 106. The controller 106 may perform one or more process control algorithm routines that have been generated by a system engineer or other system personnel using the workstation 104 or any other workstation and which have been downloaded to and instantiated in the controller 106. The controller 106 may be, for example, a DeltaV™ controller sold by Fisher-Rosemount Systems, Inc., an Emerson Process Management company. However, any other controller may be used instead. Further, while only one controller is shown in FIG. 1, additional controllers of any desired type or combination of types can be coupled to the LAN 108.

The controller 106 may be coupled to a plurality of process control devices including field devices 110a-b and a pump 112 via a digital data bus 114 and an input/output (I/O) device 116. During execution of a process control routine, the controller 106 may exchange information (e.g., commands, configuration information, measurement information, status information, etc.) with the field devices 110a-b and the pump 112. This information may include parameters within process control routine functions. For example, the controller 106 may be provided with a process control routine that, when executed by the controller 106, causes the controller 106 to send commands to the field devices 110a-b and the pump 112 that cause the field devices 110a-b and the pump 112 to perform specified operations (e.g., perform a measurement, open/close a valve, enable/disable, etc.) and/or to communicate information (e.g., measurement data) via the digital data bus 114 to the controller 106 that can be accessed by the workstation 102.

In the illustrated example of FIG. 1, the process control algorithm processor 102 is configured at the workstation 104 to define properties and configuration information to control and/or interface with the pump 112. The pump 112 may be controlled via a process control routine operated by the process control algorithm processor 102 that may be implemented within and/or executed by the controller 106. Additionally, the process control algorithm processor 102 defines properties and configuration information to control and/or interface with the field devices 110a-b. The field devices 110a-b may be any type of process control device(s) including other types of sensors or measurement devices, actuators, etc. Additionally, the field devices 110a-b may include process control equipment such as, for example, tanks, vats, mixers, boilers, heaters, etc.

In the illustrated example of FIG. 1, the devices 110a-b and 112 are fieldbus compliant devices configured to communicate via the digital data bus 114 using the well-known Foundation™ Fieldbus protocol. In accordance with the Foundation™ Fieldbus standard, the digital data bus 114 is a digital, two-way, multi-drop communication bus configured to be communicatively coupled to measurement and control devices (e.g., the devices 110a-b and 112). In the illustrated example, the I/O device 116 is implemented using an I/O subsystem interface that enables connecting the controller 106 and the devices 110a-b and 112 to other field devices, which may use the Fieldbus protocol or other types of communication protocols (e.g., Profibus protocol, HART protocol, etc.). For example, the I/O device 116 may include one or more gateways that translate between the Fieldbus protocol and other communication protocols. Additional I/O devices (similar or identical to the I/O device 116) may be coupled to the controller 106 to enable additional groups of field devices to communicate with the controller 106.

The example process control algorithm processor 102 manages one or more control routines to manage the field devices 110a-b and 112 via the I/O device 116. The control routines may include process monitoring applications, alarm management applications, process trending and/or history applications, batch processing and/or campaign management applications, statistical applications, streaming video applications, advanced control applications, etc. The controller 106 may include the process control algorithm processor 102 to control and/or manage a process control routine. An operator of the workstation 104 may access the process control algorithm processor 102 to modify and/or view a process control routine and/or data associated with the process control routine. An operator using the workstation 104 may modify and/or access the process control routines and/or data through the visual object diagram 103.

The example visual object diagram 103 includes interconnected functional blocks that represent and/or comprise one or more process control routines (e.g., process control algorithms). Each functional block may be defined to implement one or more process control functions and/or applications. For example, functional blocks may receive inputs from a process control system, generate outputs for the process control system, calculate parameters based on process control inputs and/or parameters, monitor inputs and/or parameters, store inputs and/or parameters, and/or calculate control actions.

The visual object diagram 103 is a graphical representation of a process control routine and/or algorithm. The process control algorithm processor 102 manages coordinating the process control routine with the corresponding visual object diagram 103. The functionality associated with the functional blocks is implemented as part of a process control routine by the process control algorithm processor 102 and/or the controller 106. Thus, when a user accesses process control data and/or modifies one or more functional blocks, the process control algorithm processor 102 coordinates the modifications between the visual object diagram 103 and the corresponding process control routine. In other implementations, the process control algorithm processor 102 may compile a modified visual object diagram (e.g., the visual object diagram 103) into a process control routine and store the process control routine in the controller 106.

Each functional block includes a key parameter that defines the relationship of the functional block to a coupled functional block. The coupled functional block may be a parent functional block within a hierarchical structure such that when a selected functional block is concealed, it is coupled to its specified parent functional block. The functional blocks may be organized in a hierarchical structure with primary functional blocks (e.g., parent functional blocks) coupled to other primary and/or secondary functional blocks (e.g., non-parent functional blocks, sub-level functional blocks). Each of the secondary functional blocks may further be coupled to sub-level functional blocks with each of the sub-level functional blocks coupled to lower level functional blocks, etc.

Each functional block and/or each link communicatively coupling functional blocks may be associated with a view parameter and/or a data parameter. The view parameter may specify how a functional block and/or a link is displayed by the process control algorithm processor 102 within the workstation 104. For example, a view parameter may include fields indicating the shape, size, color, and/or text to be displayed within a functional block. Additionally, the view parameter may include a field to indicate if a functional block and/or a link is to be concealed (i.e., not displayed) by the workstation 104. Furthermore, the view parameter may include a reference field for each process control parameter included within a functional block. These reference fields may reference a link used to couple a parameter of the functional block to parameter of an adjacent functional block. A view parameter associated with a link may include reference fields that specify which process control parameters within functional blocks the link are to be displayed as coupled together by the workstation 104.

The data parameters include data fields that specify how the associated functional blocks and/or links process and/or reference process control data. For example, a data parameter associated with a functional block may include data reference fields for each process control parameter within the functional block. The data reference fields specify a location within the process control system 100 for accessing the associated process control data. Each reference field may include a uniform resource locator (URL) address, a network address, and/or a database address of the location of the process control data. A data parameter associated with a link may include reference fields that specify which process control parameters within functional blocks the link functionally couples together. For example, a data parameter associated with a link may include data reference fields that reference an OUTPUT parameter within a first functional block and an INPUT parameter within a second functional block. Thus, data generated and/or referenced by the OUTPUT parameter is transferred by the link to the INPUT parameter of the second functional block using the data reference fields in the associated data parameter.

In the example of FIG. 1, the process control algorithm processor 102 manages the visual object diagram 103 that includes and/or is associated with a process control routine that manages the field devices 110*a-b* and the pump 112. Additionally, the controller 106 may include the process control algorithm processor 102 to manage the field devices 110*a-b* and 112 using the process control routine. The field devices 110*a-b* include pressure sensors and/or pressure transmitters that provide pressure input data values to the process control routine. The routine may then utilize and/or process these input values within a PID feedback loop to determine if the pressure signal indicates that a measured pressure is within a specified pressure range. If the pressure is outside of the specified range, the process control routine calculates a control action to change a speed of the pump 112. The process control routine, via the controller 106, generates a control signal routed to the pump 112 via the I/O device 116 to instruct the pump 112 to change its speed to cause the measured pressure to be within a specified pressure range.

A process control operator may modify and/or view the process control routine via the visual object diagram 103 displayed by the workstation 104. In some cases, the visual object diagram 103 may include a relatively significant number of functional blocks to implement the process control routine. In these cases, the large number of functional blocks and complex interconnections may provide a challenge for the operator to isolate and/or modify a small set of the functional blocks. For example, if the operator attempts to debug and/or rearrange some of the functional blocks to change the pressure PID routine, the other functional blocks within the visual object diagram 103 may create confusion and/or lead to the possibility of an improper or missing connection.

The operator may conceal some of the functional blocks to more efficiently and effectively modify the pressure PID functional blocks. For example, when the operator selects a functional block to be concealed, the process control algorithm processor 102 determines a key parameter for the selected functional block. The example process control algorithm processor 102 then determines a link from the key parameter to an intersection within a coupled functional block that is not specified to be concealed (e.g., a parent functional block). The process control algorithm processor 102 couples a view parameter associated with the selected functional block and a view parameter associated with the link to a view parameter associated with the adjacent parent functional block. Then, if the selected functional block does not include other process control parameters, the process control algorithm processor 102 conceals the link and the selected functional block.

In examples where the selected functional block includes other process control parameters, the example process control algorithm processor 102 determines links associated with the other process control parameters. The example process control algorithm processor 102 then determines if these links also correspond to the parent functional block, other functional blocks to be concealed, or functional blocks that are not specified to be concealed. The process control algorithm processor 102 may then determine key parameters and links for other functional blocks that are to be concealed and repeat these operations until all of the functional blocks specified to be concealed are concealed.

A functional block and/or a link is specified to be concealed by the process control algorithm processor 102 when the process control algorithm processor 102 toggles and/or sets a conceal flag within a corresponding view parameter of the functional block and/or link. Alternatively, the process control algorithm processor 102 may conceal a link and/or a functional block by setting a display field to conceal and/or by setting display properties to a null value.

The example process control algorithm processor 102 stores the conceal information included within the view parameters. When the visual object diagram 103 is closed and then reopened at a later time, the process control algorithm processor 102 determines which functional blocks and/or links are specified to be concealed. The storing of the view parameters enables a process control operator to conceal the same functional blocks within the visual object diagram 103 for current and/or future sessions. Additionally, the process control algorithm processor 102 may un-conceal or reveal functional blocks and/or links specified by an operator to be un-concealed or revealed. To un-conceal or reveal a functional block, the process control algorithm processor 102 determines a link from a coupled non-concealed functional block to the functional block selected to be revealed. The process control algorithm processor 102 then decouples the corresponding view parameters of the link and the functional block selected to be revealed from the view parameter associated with the adjacent functional block. The process control algorithm processor 102 then reveals the selected functional block and corresponding link. The process control algorithm processor 102 may also determine if the selected functional block is coupled to other functional blocks that may have been selected to be un-concealed or revealed, and if so, reveals those functional blocks and corresponding links. The process control algorithm processor 102 is described in greater detail in conjunction with FIG. 2.

The example process control system 100 is provided to illustrate one type of system within which the example methods and apparatus described in greater detail below may be advantageously employed. However, the example methods and apparatus described herein may, if desired, be advantageously employed in other systems of greater or less complexity than the example process control system 100 shown in FIG. 1 and/or systems that are used in connection with process control activities, enterprise management activities, communication activities, etc.

Figure 2:
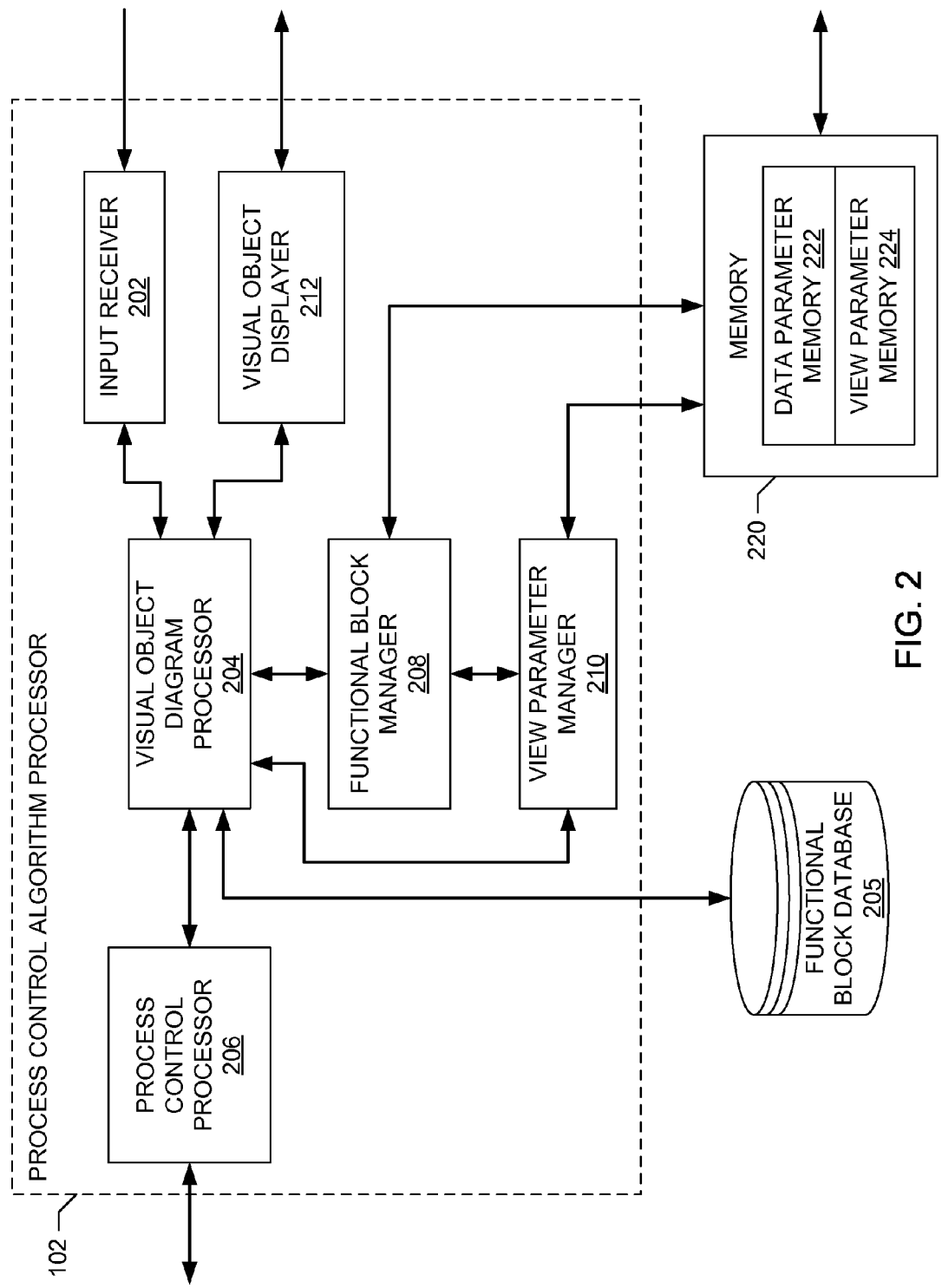
FIG. 2 is a block diagram of the example process control algorithm processor of FIG. 1 including a functional block manager and a view parameter manager.

FIG. 2 is a block diagram of the example process control algorithm processor 102 of FIG. 1. The example process control algorithm processor 102 may manage and/or process multiple visual object diagrams (e.g., the visual object diagram 103) that may be operated concurrently or, alternatively, the process control algorithm processor 102 may process the visual object diagram 103 while other process control algorithm processors process other visual object diagrams. Furthermore, the example process control algorithm processor 102 may include additional memory and/or processors to manage, and/or store information associated with operations of the process control algorithm processor 102.

The process control algorithm processor 102 includes an input receiver 202 to receive process control operator instructions and/or selections of functional blocks and/or links within the visual object diagram 103. The example receiver 202 receives instructions, commands, and/or selections from the workstation 104. The instructions may include a selection of one or more functional blocks and/or links to conceal or un-conceal within the visual object diagram 103. Additionally, the instructions may include a request to open and/or close a visual object diagram. Furthermore, the input receiver 202 may receive instructions to modify, add, and/or delete functional blocks and/or links between functional blocks within a visual object diagram. Upon receiving the instructions, the input receiver 202 converts the instructions into a format for processing by a visual object diagram processor 204. The input receiver 202 then forwards the converted instructions to the visual object diagram processor 204. For example, the input receiver 202 may receive digital messages (e.g., 8 byte words) to select and conceal or un-conceal one or more functional blocks. Upon receiving these messages, the input receiver 202 converts the messages into coded instructions decipherable by the visual object diagram processor 204.

To manage one or more visual object diagrams, the example process control algorithm processor 102 of FIG. 2 includes the visual object diagram processor 204. The example visual object diagram processor 204 receives instructions from the input receiver 202 and processes one or more visual object diagrams based on the information within the instructions. The visual object diagram processor 204 may open or close a visual object diagram, add, delete and/or modify functional blocks within a visual object diagram, access process control data, and/or manage the display of functional blocks and links within a visual object diagram. Additionally, the visual object diagram processor 204 manages the concealment and/or un-concealment of selected functional blocks and/or links.

In examples where a visual object diagram is modified by adding, deleting, and/or changing functional blocks, the visual object diagram processor 204 forwards those modifications to a process control processor 206. Upon receiving the modifications, the process control processor 206 updates the corresponding process control routine based on the modifications. In other examples, the visual object diagram processor 204 may compile the modifications to a visual object diagram, generate a corresponding process control routine, and transmit the process control routine to the process control processor 206. Thus, the visual object diagram processor 204 transforms a graphical representation of a process control routine (e.g., a visual object diagram) into a corresponding algorithm executable by the process control processor 206 and/or the controller 106 of FIG. 1. In an alternative implementation, the visual object diagram processor 204 may modify and store a visual object diagram to a memory. Then, the process control processor 206 and/or the controller 106 may compile the visual object diagram into a process control routine and proceed to manage a process control system using the routine.

The example process control processor 206 may perform, manage, and/or operate process control routines. In other examples, the process control processor 206 may store process control routines to a memory, compile process control routines into a readable format for the controller 106, and/or transmit process control routines to the controller 106. The controller 106 may then perform the process control routine. The process control processor 206 may be communicatively coupled to the controller 106 and/or to other components within the workstation 104 that communicate with the controller 106. In other examples, the process control processor 206 may be included within the controller 106.

To access visual object diagrams and/or functional blocks, the example visual object diagram processor 204 is communicatively coupled to a functional block database 205. The example functional block database 205 stores visual object diagrams and/or default functional blocks. The visual object diagram processor 204 accesses the functional block database 205 to access visual object diagrams and/or functional blocks to add and/or modify a visual object diagram based on commands from an operator. Furthermore, the visual object diagram processor 204 may store visual object diagrams and/or modified functional blocks to the functional block database 205. The functional block database 205 may be implemented by EEPROM, RAM, ROM, and/or any other type of memory.

The example visual object diagram processor 204 of FIG. 2 determines if any of the received instructions include a selection of functional blocks to conceal and/or un-conceal. If a functional block has been selected, the visual object diagram processor 204 forwards the selected functional blocks to a functional block manager 208 and/or a view parameter manager 210. The visual object diagram processor 204 may forward the functional blocks by forwarding a reference to the functional blocks within the corresponding visual object diagram, forwarding a location in a memory of the functional blocks, and/or forwarding the visual object diagram including the functional blocks.

Additionally, upon the functional block manager 208 and/or the view parameter manager 210 concealing and/or un-concealing selected functional blocks and/or links, the visual object diagram processor 204 modifies the corresponding visual object diagram by removing the concealed functional blocks from being displayed at the workstation 104 and/or adding un-concealed functional blocks to be displayed. Additionally, in some implementations, the visual object diagram processor 204 may display a graphical indication within a parent functional block indicating coupled sub-level functional blocks are concealed.

The example functional block manager 208 of FIG. 2 receives instructions from the visual object diagram processor 204 including instructions regarding which functional blocks are to be concealed or un-concealed. Upon receiving instructions to conceal a functional block (e.g., a first functional block), the functional block manager 208 determines a link from a process control parameter within the first functional block to an intersection within a second functional block (e.g., a parent functional block). The functional block manager 208 may determine the link by identifying which process control parameter within the first functional block corresponds to a key process control parameter. The key process control parameter may be specified by a process control operator and/or a designer of the functional block.

Upon determining the link to the second functional block, the functional block manager 208 determines if the second functional block has been selected to be concealed. If the second functional block was selected to be concealed, the functional block manager 208 determines a key parameter within the second functional block to identity a link to the parent functional block of the second functional block. The functional block manager 208 may continue to determine higher level functional blocks until a higher level parent functional block is not specified to be concealed. For example, if the second functional block is not specified to be concealed, the functional block manager 208 determines other parameters within the first functional block and identifies functional blocks coupled to those parameters via links. If any of those functional blocks were selected to be concealed, the functional block manager 208 then identifies key parameters and/or parameters within those functional blocks to determine if sub-level functional blocks are to be concealed.

Upon identifying the parameters within the first functional block and which functional blocks coupled to those parameters are to be concealed, the example functional block manager 208 conceals those functional blocks and/or links coupling those functional blocks. The functional block manager 208 may conceal the functional blocks and/or links by sending an instruction to the view parameter manager 210 to set a flag within each of the view parameters associated with the functional blocks and/or links to be concealed. Additionally, the functional block manager 208 may conceal a functional block by sending an instruction to the visual object diagram processor 204 to remove the functional block and/or links from display within the corresponding visual object diagram.

The example functional block manager 208 may determine which functional block process control parameters are coupled to which links by referencing a data parameter associated with the link. The data parameters associated with links may include reference fields identifying which functional block process control parameters are coupled to the link. These reference fields may identify a functional block by a URL address, a reference identification value of the corresponding process control parameters and/or functional block, a location within a directory, a location within a database, and/or any other process control memory location to a process control parameter. Additionally, the data parameters associated with functional blocks may include reference fields to specify which link is coupled to the associated process control parameter and/or functional block. These reference fields may include an identifier of the corresponding link, a URL address of the link, and/or any other process control memory location to the link.

Additionally, the example functional block manager 208 may receive instructions to un-conceal one or more functional blocks. Upon receiving an instruction to un-conceal at least a first functional block, the functional block manager 208 determines a parent functional block of a functional block selected to be un-concealed. The functional block manager 208 may determine a parent functional block by identifying a key parameter within a functional block selected to be un-concealed. The functional block manager 208 then continues to identify other links and/or functional blocks coupled to the first functional block that are also specified to be un-concealed. Upon identifying the functional blocks and/or links to un-conceal, the functional block manager 208 may send instructions to the view parameter manager 210 to modify the view parameters associated with these functional blocks and/or links so that they may be displayed. Additionally, the functional block manager 208 may send an instruction to the visual object diagram processor 204 to un-conceal the specified functional blocks and/or links within the corresponding visual object diagram.

The example view parameter manager 210 of FIG. 2 receives instructions from the functional block manager 208 to modify a conceal flag within view parameters associated with links and/or functional blocks specified to be un-concealed and/or concealed. Additionally, the view parameter manager 210 may couple view parameters associated with functional blocks and/or links specified to be concealed to a view parameter associated with a parent functional block. Similarly, the view parameter manager 210 may decouple view parameters associated with functional blocks and/or links specified to be un-concealed from a view parameter associated with a parent functional block.

The example view parameter manager 210 may modify a conceal flag by accessing a view parameter associated with a functional block and/or a link and toggling a conceal switch. In other examples, the view parameter manager 210 may set a conceal flag within a view parameter by specifying CONCEAL or UN-CONCEAL in a conceal reference field and/or by setting a conceal bit. In additional to setting a conceal flag, the view parameter manager 210 may set and/or specify an indication at an intersection within a parent functional block to indicate sub-level functional blocks are concealed.

The view parameters specify how functional blocks and/or links may be displayed within a visual object diagram. In addition to fields specifying graphical display properties such as, for example, color, height, line weight, the view parameters may include fields that specify how a link and/or functional block may be displayed as coupled to an adjacent functional block and/or link. Additionally, the view parameters may include fields specifying if a functional block is to be concealed (e.g., not displayed within a visual object diagram) and/or if the view parameter is to be linked to a view parameter of a functional block that is not specified to be concealed. Furthermore, the view parameter may include fields to indicate if a parameter within a functional block is to be displayed with an indication that a sub-level functional block is concealed. This indication may include a graphical indication such as shading and/or a textual indication such as a reference name of the functional block and/or process control parameter associated with the concealed functional block.

The example view parameter manager 210 may couple view parameters associated with functional blocks and/or links specified to be concealed by modifying a reference field within the view parameters. For example, a view parameter associated with a functional block to be concealed may include a conceal reference field. The view parameter manager 210 may add a reference in the conceal reference field corresponding to a view parameter of a parent functional block. Alternatively, if the parent functional block is also specified to be concealed, the view parameter manager 210 may add a reference in the reference conceal field to the next highest hierarchical functional block not specified to be concealed. Furthermore, the view parameter manager 210 may couple view parameters of functional blocks and/or links to be concealed by adding a reference in the conceal reference field to an intersection within a parent functional block.

By referencing the view parameter associated with the functional block to be concealed with a view parameter of a functional block not to be concealed, an operator may still access data within the view parameter associated with the concealed functional block via the non-concealed functional block despite the functional block being concealed. This data may include an option to un-conceal the functional block. Additionally, in some examples, a link coupling a functional block to be concealed with a sub-level functional block not to be concealed may be modified so that the link couples the sub-level functional block with a parent of the concealed functional block. In these examples, the view parameter manager 210 modifies a link reference within the view parameter associated with the link to include a process control parameter and/or an intersection within the parent functional block.

Additionally, the view parameter manager 210 may decouple view parameters of functional blocks selected to be un-concealed from functional blocks that have not been concealed. In these examples, the view parameter manager 210 may remove conceal reference links from the associated view parameters and modify the link references to include process control parameters within functional blocks specified to be un-concealed.

The example view parameter manager 210 and/or the functional block manager 208 may access and/or store view parameters and/or data parameters within a memory 220. The example memory 220 may include a data parameter memory 222 and a view parameter memory 224. The memory 220, the data parameter memory 222, and/or the view parameter memory 224 may be implemented by EEPROM, RAM, ROM, and/or any other type of memory.

The example data parameter memory 222 includes data parameters associated with functional blocks and/or links within visual object diagrams. The example view parameter memory 224 includes view parameters associated with functional blocks and/or links within visual object diagrams. A view parameter and/or a data parameter may be created and stored in the memory 220 for each newly created functional block and/or link. Furthermore, a process control operator and/or administrator may modify any of the data parameters and/or view parameters within the memory 220 directly without accessing the corresponding functional blocks and/or links. In these cases, changes made to the data and/or view parameters may be updated and compiled within the corresponding visual object diagram and/or process control routine.

To manage the display of visual object diagrams (e.g., the visual object diagram 103), the example process control algorithm processor 102 includes a visual object displayer 212. The example visual object displayer 212 receives a visual object diagram from the visual object diagram processor 204 and determines which functional blocks and/or links to display. The visual object displayer 212 may identify the functional blocks and/or links to display by accessing the view parameters associated with each of the functional blocks and/or links to determine which are set to conceal. The visual object displayer 212 then displays the functional blocks that do not include a set conceal flag. Additionally, the visual object displayer 212 displays links coupling those functional blocks by accessing the link references within the view parameters of the links to determine which process control parameters and/or intersections are coupled together by which links.

Additionally, the visual object displayer 212 may display an indication at one or more intersections within parent functional blocks indicating that one or more sub-level functional blocks are concealed. This indication may include a graphical symbol, icon, shading, and/or text identifying the concealed functional block and/or a coupled process control parameter within a concealed functional block. Alternatively, the indication may include a value of the process control parameter, a name of the process control parameter, a status of the process control parameter, an identification number of the process control parameter, a location of the process control parameter, a name of the associated functional block, or an identification number of the associated functional block.

The example visual object displayer 212 of FIG. 2 may display highlighted text when an operator scrolls over an intersection with an indication. By scrolling over the intersection with a cursor, the visual object displayer 212 may display a list of which functional blocks and/or links are concealed and coupled to that intersection. In these cases, the visual object diagram processor 204 may receive commands that an operator has scrolled over an intersection from the input receiver 202. The visual object diagram processor 204 then forwards the command to the visual object displayer 212. The visual object displayer 212 then determines if the intersection includes an indication and displays a text box listing the concealed functional blocks and/or links. An operator may then select one or more of the listed concealed functional blocks. Upon selecting one of the listed concealed functional blocks, the process control algorithm processor 102 may then un-conceal those functional blocks and corresponding links.

While an example manner of implementing the process control algorithm processor 102 is depicted in FIG. 2, one or more of the interfaces, data structures, elements, processes and/or devices illustrated in FIG. 2 may be combined, divided, rearranged, omitted, eliminated and/or implemented in any other way. For example, the example input receiver 202, the example visual object diagram processor 204, the example process control processor 206, the example functional block manager 208, the example view parameter manager 210, the example visual object displayer 212, the example functional block database 205, and/or the example memory 220 illustrated in FIG. 2 may be implemented separately and/or in any combination using, for example, machine-accessible or readable instructions executed by one or more computing devices and/or computing platforms (e.g., the example processing platform 910 of FIG. 9).

Further, the example input receiver 202, the example visual object diagram processor 204, the example process control processor 206, the example functional block manager 208, the example view parameter manager 210, the example visual object displayer 212, the example functional block database 205, the example memory 220 and/or, more generally, the process control algorithm processor 102 may be implemented by hardware, software, firmware and/or any combination of hardware, software and/or firmware. Thus, for example, any of the example input receiver 202, the example visual object diagram processor 204, the example process control processor 206, the example functional block manager 208, the example view parameter manager 210, the example visual object displayer 212, the example functional block database 205, the example memory 220 and/or, more generally, the process control algorithm processor 102 can be implemented by one or more circuit(s), programmable processor(s), application specific integrated circuit(s) (ASIC(s)), programmable logic device(s) (PLD(s)) and/or field programmable logic device(s) (FPLD(s)), etc.

Figure 3:
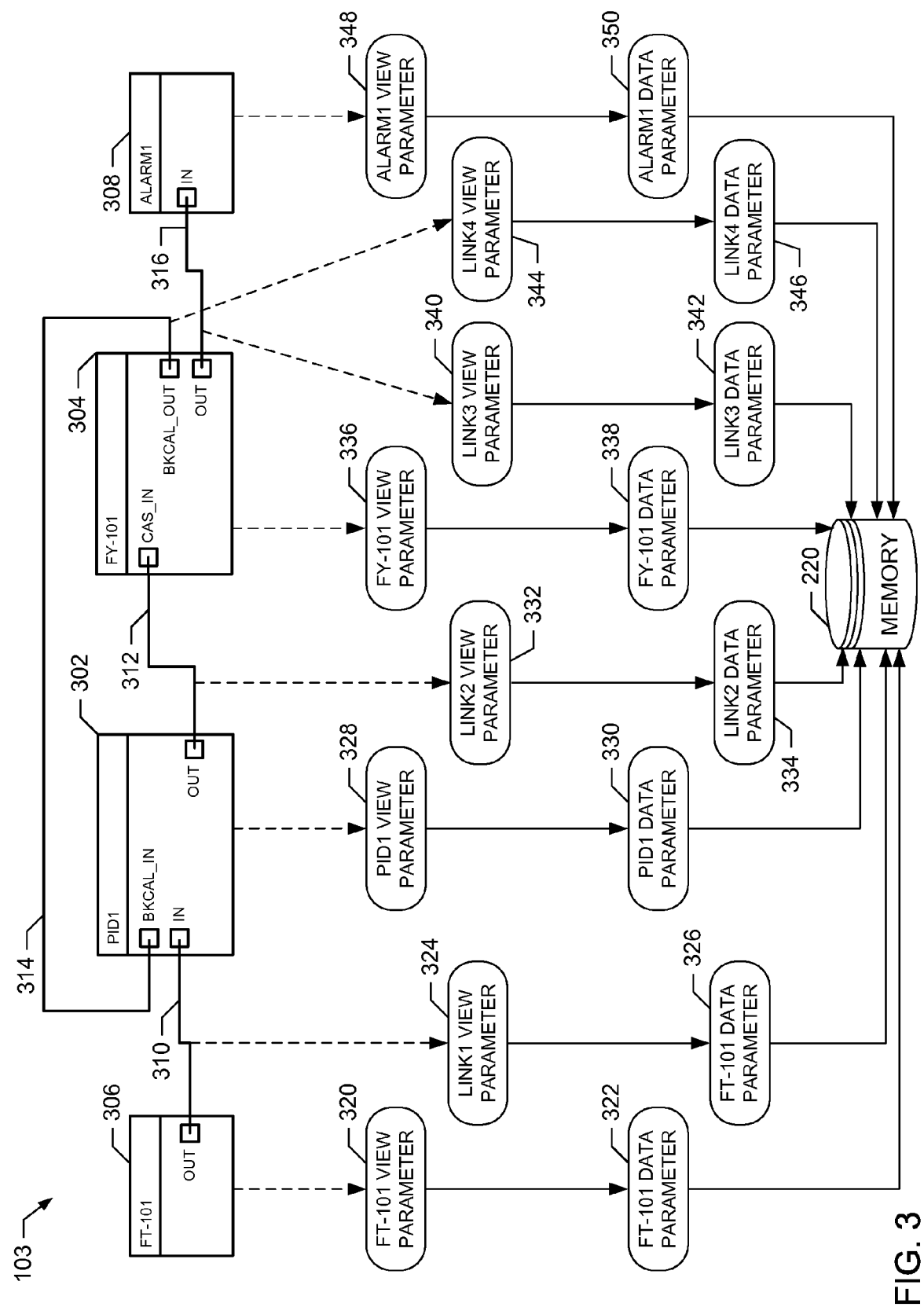
FIG. 3 is a diagram of the example visual object diagram of FIG. 1 including links to respective view parameters and data parameters.

FIG. 3 is a diagram of the example visual object diagram 103 of FIG. 1 that includes functional blocks 302-308 and links 310-316. For brevity, the example visual object diagram 103 shows the functional blocks 302-308. However, in other examples, the visual object diagram 103 may include additional functional blocks coupled together by additional links. For example, a typical process control system may include dozens of interconnected functional blocks coupled together by links.

The example functional blocks 302-308 are coupled together to implement a PID feedback loop with an alarm. The functional block 302 may include a PID control algorithm and/or routine to calculate an output based on an input value and a feedback value. The output value corresponds to an OUT parameter, the input value corresponds to an IN parameter, and the feedback value corresponds to a BKCAL_IN parameter within the functional block 302. The IN parameter of the functional block 302 is communicatively coupled via the link 310 to an OUT parameter of the functional block 306.

The example functional block 306 may receive a process control data value from one or more field devices and convert the received data into a parameterized value for the PID1 functional block 302. The FT-101 functional block 306 then transmits the value via the OUT parameter to the IN parameter of the PID1 functional block 302. Upon calculating an output value, the PID1 functional block outputs the output value via the OUT parameter via the link 312 to a CAS_IN parameter within the functional block 304. The example functional block 304 may use the output value to calculate a control action and/or a calibration value based on the received output value. The FY-101 functional block 304 may then transmit this control action through an OUT parameter to an IN parameter within the ALARM1 functional block 308 via the link 316. Additionally, the FY-101 functional block 304 may transmit the calibration value through a BKCAL_OUT parameter.

Each of the example functional blocks 302-208 and the links 310-316 are associated with view and data parameters 320-350. For example, the functional block 306 is associated with the FT-101 view parameter 320 and the FT-101 data parameter 322. The FT-101 view parameter 320 specifies how the FT-101 functional block 306 is displayed within the visual object diagram 103 and the FT-101 data parameter 322 specifies a data source for the OUT parameter. Additionally, the data parameter 322 may include a reference to the link 310. The LINK1 view parameter 324 may include reference fields to the OUT parameter of the functional block 306 and to the IN parameter of the functional block 302. Furthermore, the LINK1 data parameter 326 may include references to the OUT parameter of the functional block 306 and to the IN parameter of the functional block 302. Similarly, the functional blocks 302, 304, and 308 and the links 312-316 are associated with the respective view and data parameters 328-350.

The view and data parameters 320-350 may be stored within the memory 220 of FIG. 2. Each of the functional blocks 302-308 and/or links may reference display data and/or process control data by accessing the respective view and/or data parameters 320-350 within the memory 220. Additionally, the visual object diagram 103, the functional blocks 302-308, and the links 312-316 may be stored within the memory 220. Alternatively, the visual object diagram 103 may be stored in another memory separate from the memory 220.

A process control operator using a workstation (e.g., the workstation 104), may select one or more of the functional blocks 302-308 and/or one or more of the links 310-316 to conceal. An operator may individually select each functional block 302-308 and/or link 310-316 to be concealed. Alternatively, the operator may highlight and/or circle with a cursor the functional blocks 302-308 to be concealed. The operator may specify the functional blocks 302-308 to be concealed by selecting a conceal function within the visual object diagram 103 and/or a conceal function on a control panel associated with the visual object diagram 103. In other examples, an operator may designate a 'hot-key' on a keyboard or may right click on a cursor to conceal selected ones of the functional blocks 302-308 and/or the links 310-316.

By selecting the functional block 304 to conceal, the process control algorithm processor 102 of FIGS. 1 and 2 determines a key parameter within the functional block 304. In this example, the CAS_IN parameter may be specified as the key parameter. The process control algorithm processor 102 then identifies the link 312 coupled to the CAS_IN key parameter and the OUT parameter of the functional block 302 (e.g., a parent functional block). The process control algorithm processor 102 may then identify the BKCAL_OUT and the OUT parameters within the functional block 304 and determine that the links 314 and 316 are coupled to these parameters. The process control algorithm processor 102 then identifies the functional blocks 302 and 308 coupled to the respective links 314 and 316. Because the functional block 314 is a parent functional block and the functional block 308 is a sub-level functional block that is not specified to be concealed, the process control algorithm processor 102 conceals the links 312 and 314 in addition to the functional block 304. Additionally, the link 316 is modified to be shown as coupled to the functional block 302 despite being functionally coupled to the functional block 304 via the data parameter 346.

Figure 4:
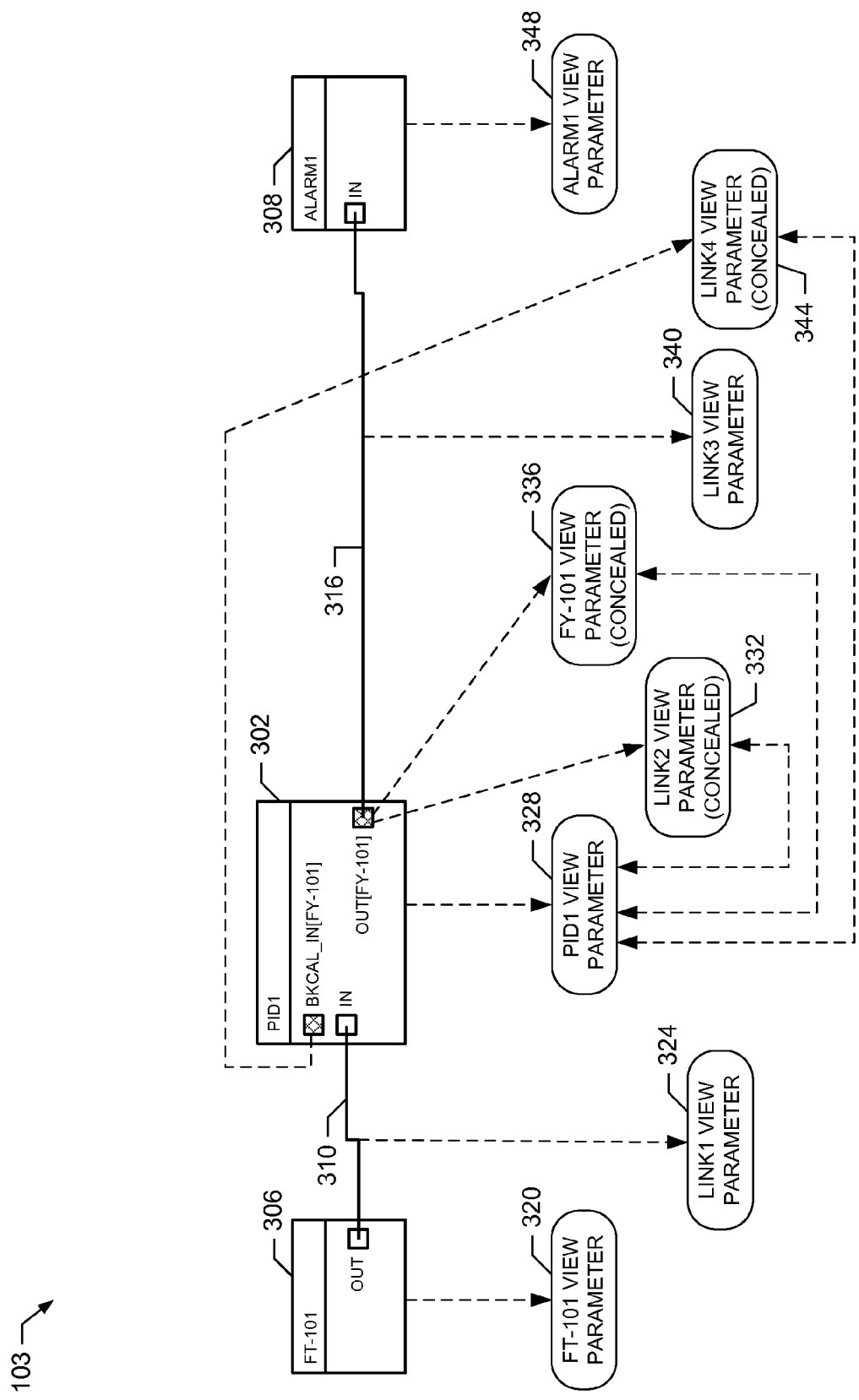
FIG. 4 is a diagram of the example visual object diagram of FIG. 3 with the example FY-101 functional block concealed.

FIG. 4 is a diagram of the example visual object diagram 103 of FIG. 3 with the example FY-101 functional block 304 concealed. The data parameters 322, 326, 330, 334, 338, 342, 346, and 350 and the memory 220 are unchanged from FIG. 3 and are not displayed in FIG. 4 for brevity. Additionally, the functional blocks 302-308 and/or the links 310-316 are associated with the data parameters 322, 326, 330, 334, 338, 342, 346, and 350 in the same manner as in FIG. 3

In the example of FIG. 4, a process control operator has selected the functional block 304 to be concealed. Upon selecting the functional block 304, the process control algorithm processor 102 of FIGS. 1 and 2 conceals the functional block 304 and the corresponding links 312 and 316. Because the ALARM1 functional block 308 is not specified to be concealed, the LINK3 view parameter 340 associated with the link 316 is modified such that the link is displayed as coupling the IN parameter of the functional block 308 to the OUT parameter of the functional block 302. However, the data parameter 342 associated with the link 318 is unchanged and continues to couple the IN parameter of the functional block 308 to the OUT parameter of the functional block 304. This enables the visual object diagram 103 to function as if the functional block 304 were still displayed.

By concealing the functional block 304, the status of the conceal flag within the FY-101 view parameter 336, the LINK2 view parameter 332, and the LINK4 view parameter are changed to CONCEALED. Additionally, the FY-101 view parameter 336, the LINK2 view parameter 332, and the LINK4 view parameter are coupled to the PID1 view parameter 328 associated with the functional block 302. Additionally, the FY-101 view parameter 336 and the LINK2 view parameter 332 may be coupled to the OUT parameter (e.g., intersection) and the LINK4 view parameter 344 may be coupled to the BKCAL_IN parameter of the functional block 302. These intersections are the portions of the functional block 302 that are functionally coupled to the concealed functional block 304.

Additionally, by concealing the functional block 304, the OUT parameter and/or intersection of the functional block 302 is displayed with a graphical indication of shading and a textual indication of the identification value of the FY-101 functional block 304. Similarly, the BKCAL_IN parameter and/or intersection of the functional block 302 is displayed with a graphical indication of shading and a textual indication of the identification value of the FY-101 functional block 304. If a process control operator were to scroll over those intersections with a cursor, a dialog box may appear with an option to un-conceal the functional block 304.

A process control operator may then select to conceal the functional block 308. Upon selecting the functional block 308, the process control algorithm processor 102 determines that the IN parameter is the key parameter. Upon identifying the IN parameter as the key parameter, the example process control algorithm processor 102 identifies the coupled link 316. The process control algorithm processor 102 then determines the functional block 302 as being displayed coupled to the link 316. Additionally or alternatively, the process control algorithm processor 102 may determine that the link 316 is functionally coupled to the functional block 304. Upon determining the functional block 308 is not coupled to other functional blocks specified to be concealed, the process control algorithm processor 102 conceals the functional block 308 and the link 316. In other examples, a process control operator may select one or more of the functional blocks 302-308 to conceal at the same time.

Figure 5:
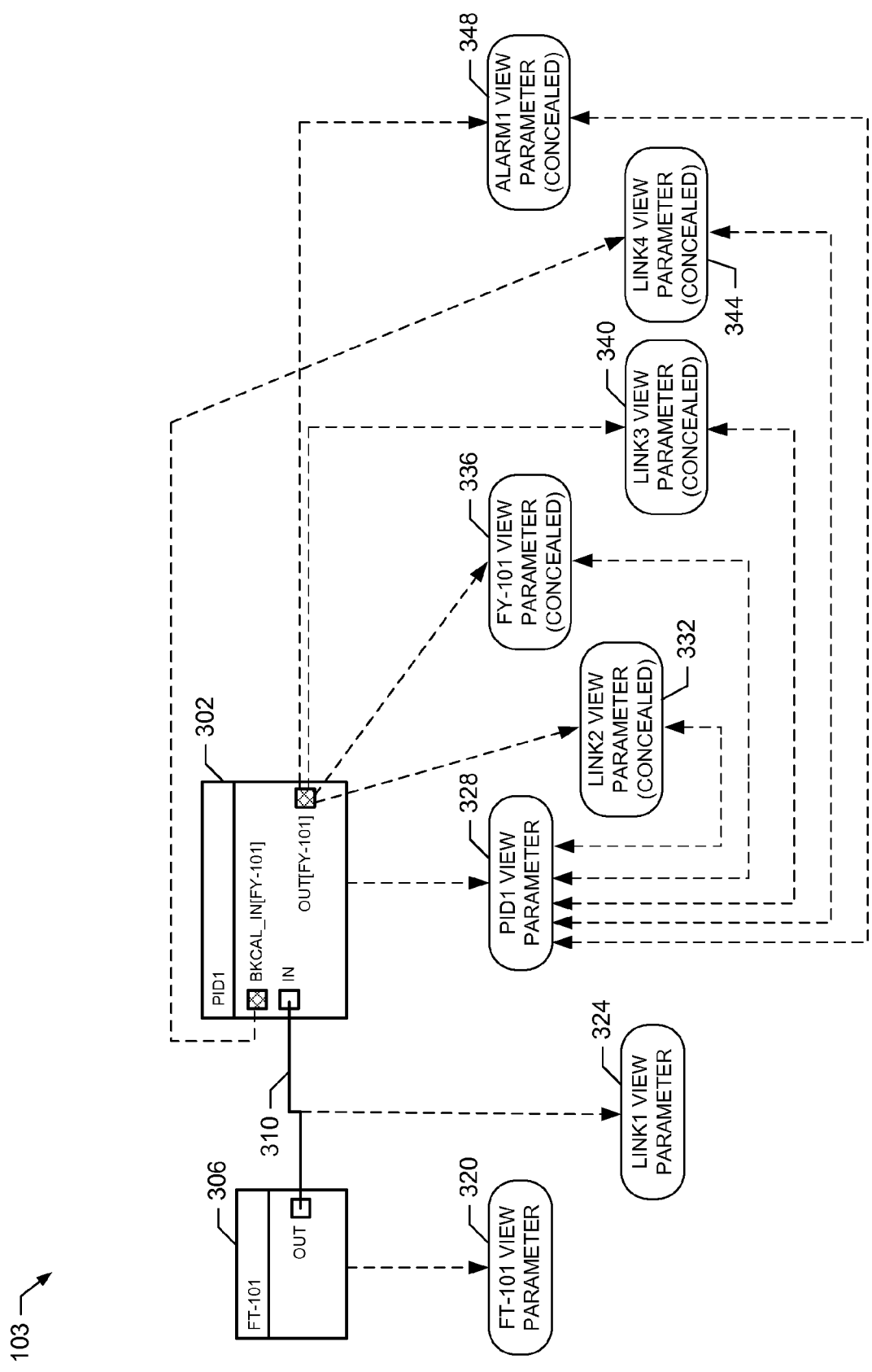
FIG. 5 is a diagram of the example visual object diagram of FIG. 4 with example the ALARM 1 functional block concealed.

FIG. 5 is a diagram of the example visual object diagram 103 of FIG. 4 with example the ALARM 1 functional block 308 and the link 316 concealed. Upon concealing the functional block 308 and the link 316, the conceal flags of the ALARM1 view parameter 348 and the LINK3 view parameter 340 are set to CONCEALED and coupled to the PID1 view parameter 328. Additionally, the ALARM1 view parameter 348 and the LINK3 view parameter 340 may be coupled to the OUT parameter and/or intersection of the functional block 302. Thus, if a process control operator were to scroll over the OUT parameter of the functional block 302 with a cursor, a list of the concealed functional blocks 304 and 308 would be displayed.

A process control operator may then select the functional block 306 to conceal. Upon selecting the functional block 306, the process control algorithm processor 102 determines that the OUT parameter is the key parameter. Upon identifying the OUT parameter as the key parameter, the example process control algorithm processor 102 identifies the coupled link 310. The process control algorithm processor 102 then identifies the functional block 302 coupled to the link 310. Upon determining the functional block 306 is not coupled to other functional blocks specified to be concealed, the process control algorithm processor 102 conceals the functional block 306 and the link 310.

Figure 6:
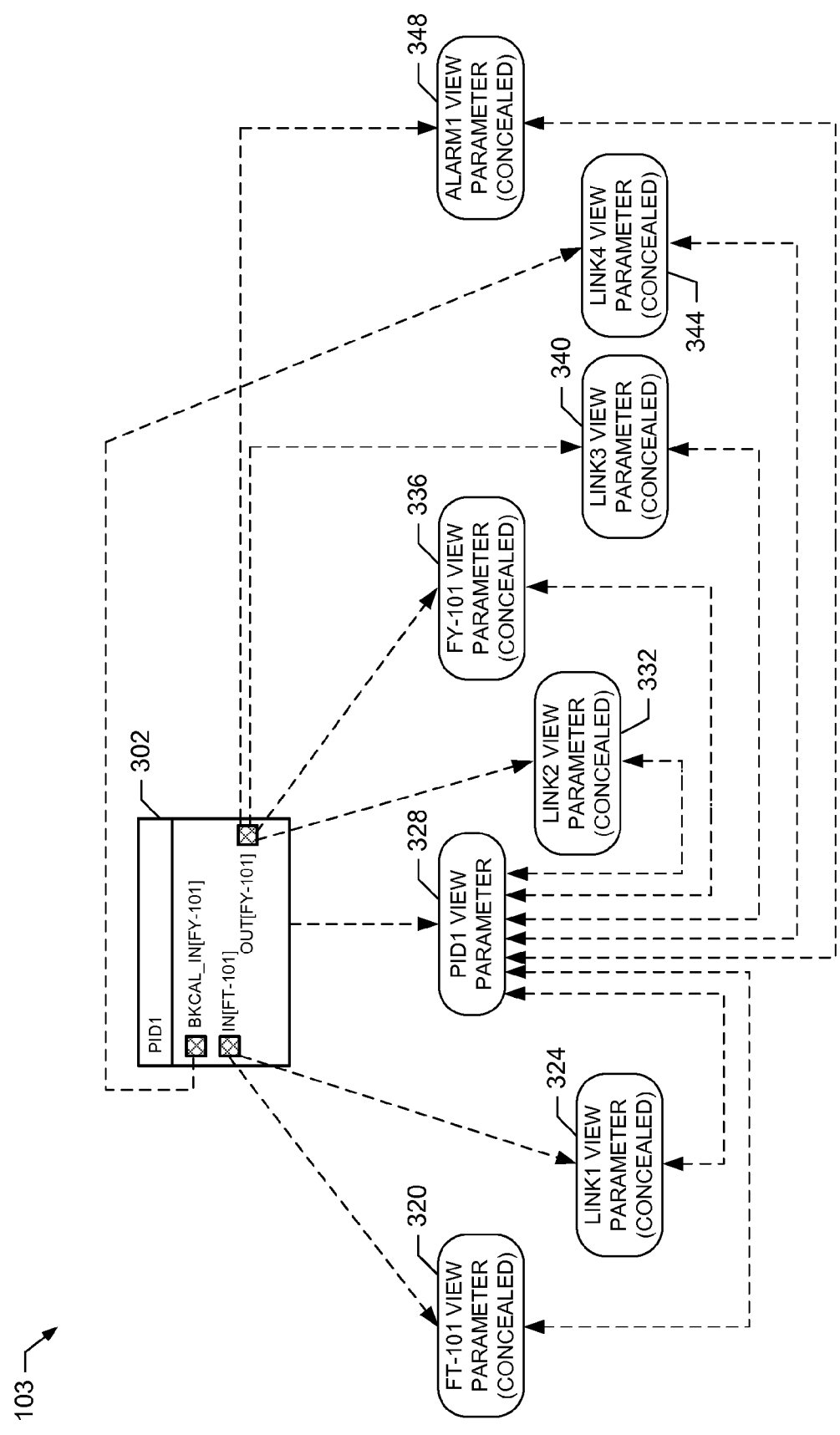
FIG. 6 is a diagram of the example visual object diagram of FIG. 5 with example the FT-101 functional block concealed.

FIG. 6 is a diagram of the example visual object diagram 103 of FIG. 5 with example the FT-101 functional block 306 and the link 310 concealed. Upon concealing the functional block 306 and the link 310, the conceal flags of the FT-101 view parameter 320 and the LINK1 view parameter 324 are set to CONCEALED and coupled to the PID1 view parameter 328. Additionally, the FT-101 view parameter 320 and the LINK1 view parameter 324 may be coupled to the IN parameter and/or intersection of the functional block 302. Thus, if a process control operator were to scroll over the IN parameter of the functional block 302 with a cursor, a list of the concealed functional block 306 would be displayed.

A process control operator may store the visual object diagram 103 with the concealed functional blocks 304-308. Then, upon opening the visual object diagram 103, the functional blocks 302-308 would remain concealed. Additionally, a process control operator may select any one of the functional blocks 304-308 to un-conceal or reveal them. If a process control operator selects at least one functional block 304-308 to un-conceal, the process control algorithm processor 102 decouples the associated view parameters and un-conceals the associated links to be displayed within the visual object diagram.

FIGS. 7A, 7B, 7C, and 8 are flowcharts of example methods that may be carried out to implement the example process control algorithm processor 102, the example visual object diagram processor 204, the example functional block manager 208, the example view parameter manager 210, and/or the example visual object displayer 212 of FIG. 1 and/or 2. The example methods of FIGS. 7A, 7B, 7C, and 8 may be carried out by a processor, a controller and/or any other suitable processing device. For example, the example methods of FIGS. 7A, 7B, 7C, and 8 may be embodied in coded instructions stored on any tangible computer-readable medium such as a flash memory, a CD, a DVD, a floppy disk, a ROM, a RAM, a programmable ROM (PROM), an electronically-programmable ROM (EPROM), an electronically-erasable PROM (EEPROM), an optical storage disk, an optical storage device, magnetic storage disk, a magnetic storage device, and/or any other medium that can be used to carry or store program code and/or instructions in the form of methods or data structures, and which can be accessed by a processor, a general-purpose or special-purpose computer, or other machine with a processor (e.g., the example processor platform 910 discussed below in connection with FIG. 9). Combinations of the above are also included within the scope of computer-readable media.

Methods comprise, for example, instructions and/or data that cause a processor, a general-purpose computer, special-purpose computer, or a special-purpose processing machine to implement one or more particular methods. Alternatively, some or all of the example methods of FIGS. 7A, 7B, 7C, and 8 may be implemented using any combination(s) of ASIC(s), PLD(s), FPLD(s), discrete logic, hardware, firmware, etc.

Also, some or all of the example methods of FIGS. 7A, 7B, 7C, and 8 may instead be implemented using manual operations or as any combination of any of the foregoing techniques, for example, any combination of firmware, software, discrete logic and/or hardware. Furthermore, many other methods of implementing the example operations of FIGS. 7A, 7B, 7C, and 8 may be employed. For example, the order of execution of the blocks may be changed, and/or one or more of the blocks described may be changed, eliminated, sub-divided, or combined. Additionally, any or all of the example methods of FIGS. 7A, 7B, 7C, and 8 may be carried out sequentially and/or carried out in parallel by, for example, separate processing threads, processors, devices, discrete logic, circuits, etc.

Figure 7A:
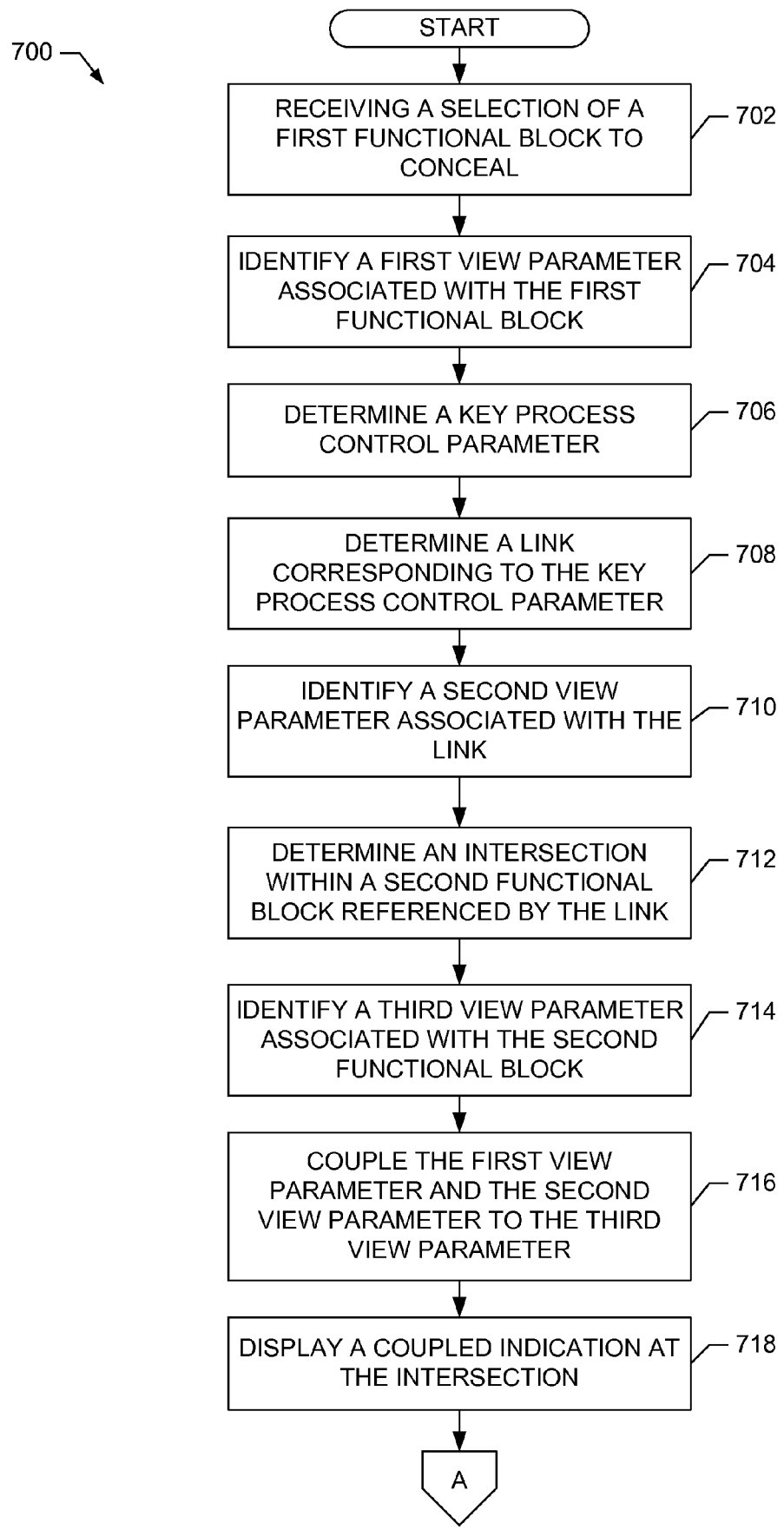
FIGS. 7A, 7B, 7C, and 8 are flowcharts of example methods that may be used to implement the example process control algorithm processor, the example functional block manager, the example view parameter manager, and/or the visual object displayer of FIGS. 1 and 2.
Figure 7B:
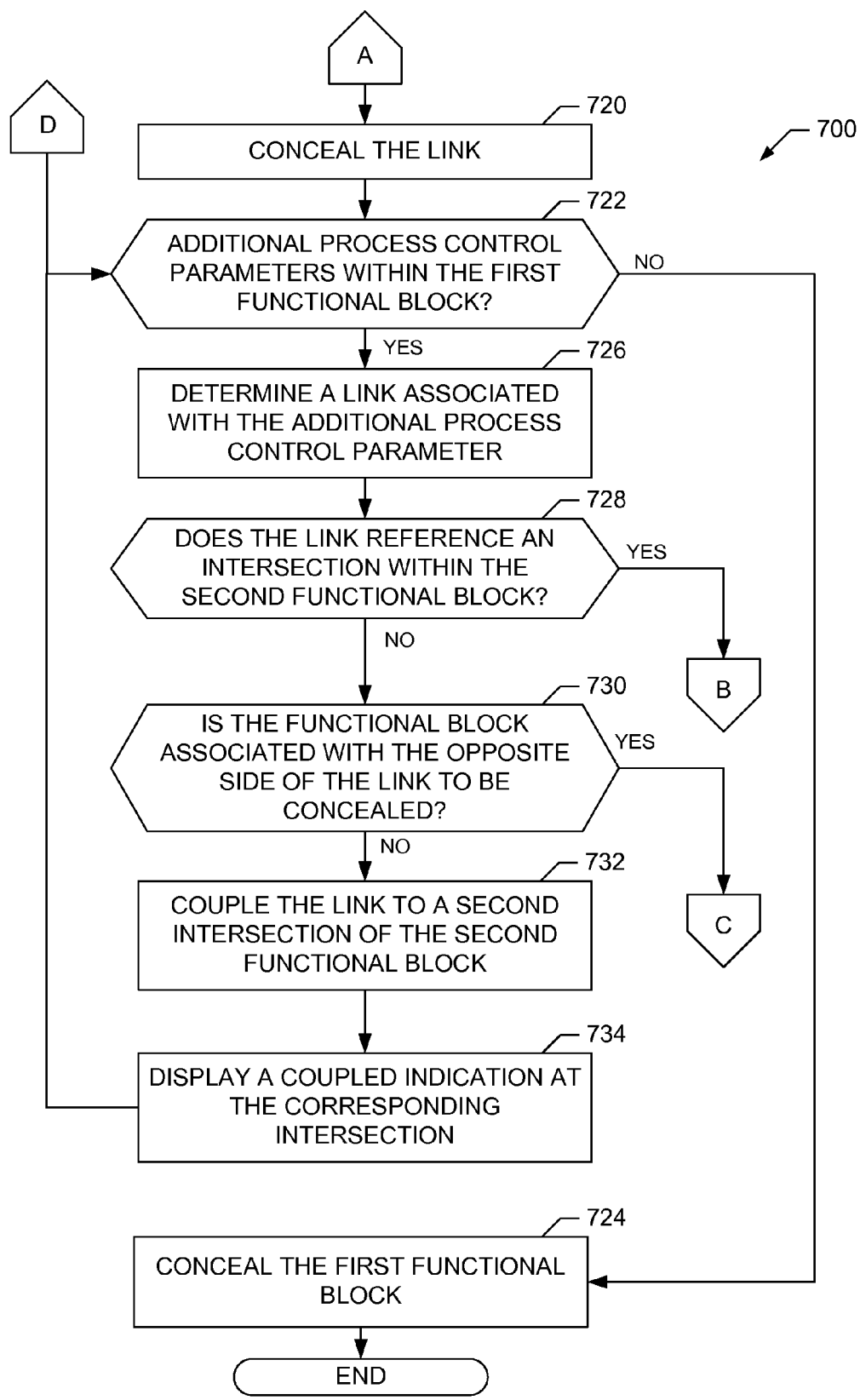
Figure 7C:
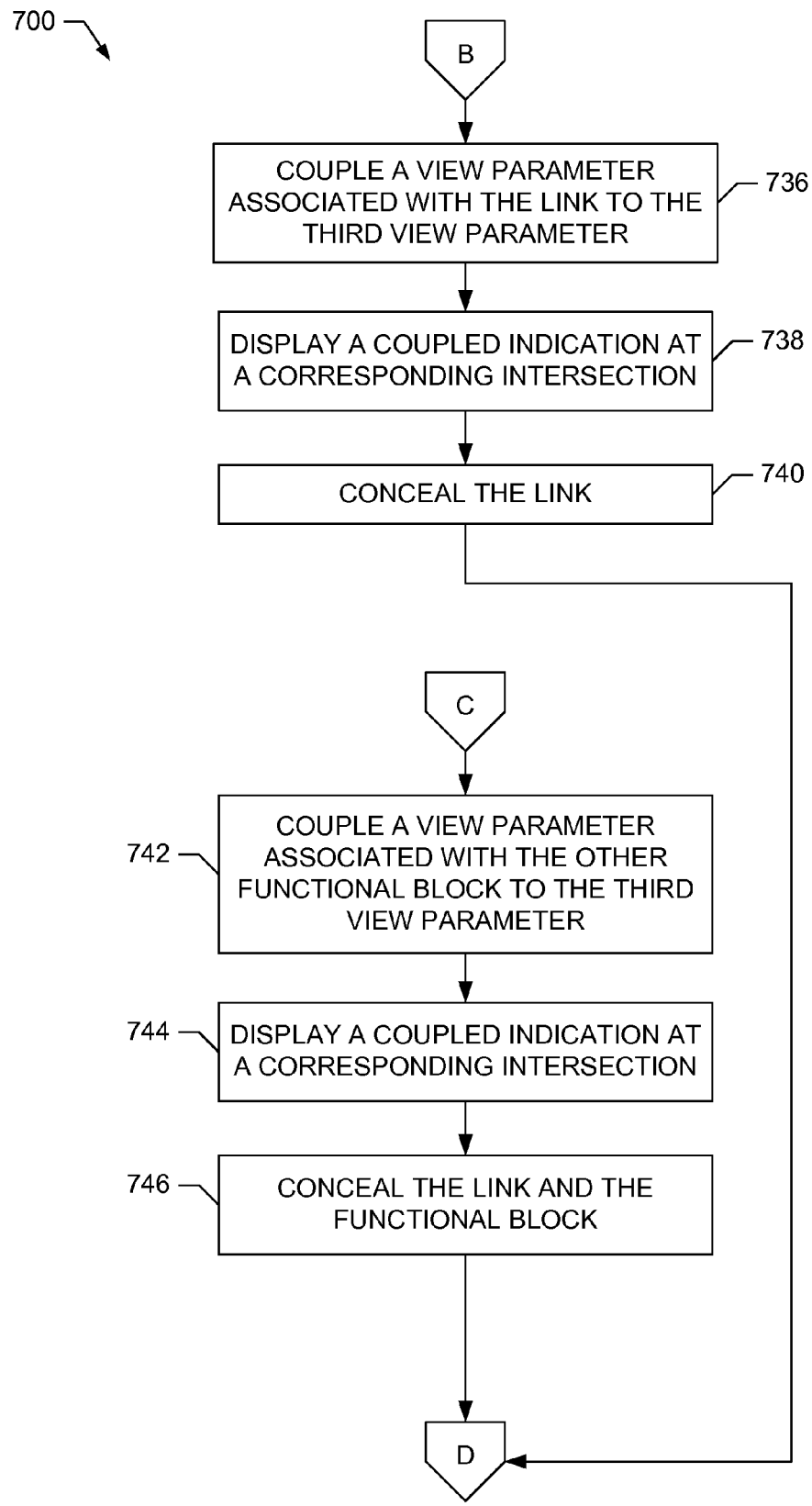

The example method 700 of FIGS. 7A, 7B, and 7C conceals portions of the visual object diagram 103 within the process control system 100 of FIG. 1. Other example methods 700 may be implemented to conceal other functional blocks in other sections of the visual object diagram 103 or, alternatively, may be implemented to conceal functional blocks in other visual object diagrams. Additionally, multiple example methods 700 may be executed in parallel or series as functional blocks within visual object diagrams (e.g., the visual object diagram 103) are subsequently selected to be concealed.

The example method 700 of FIG. 7A begins when a first functional block within a visual object diagram (e.g., the visual object diagram 103) is selected to be concealed. The example method 700 receives the selection of the first functional block (block 702). In another example, a group of functional blocks may be selected to be concealed. If multiple functional blocks are to be concealed, the example method 700 selects a first functional block within the group of selected functional blocks and proceeds to conceal the first functional block and any selected functional blocks coupled to the first functional block. If there are additional selected functional blocks upon executing the example method 700, the example method 700 may identify one or more other selected first functional blocks and conceal the other first functional blocks and any coupled functional blocks selected to be concealed. For example, two different groups of functional blocks may be selected to be concealed. Each of the groups includes interconnected functional blocks. The example method 700 selects a first functional block in the first group and proceeds to conceal the selected functional blocks in the first group. The example method 700 then selects a first functional block in the second group and proceeds to conceal the selected functional blocks in the second group. In other example implementations, the example method 700 may conceal each group of functional blocks concurrently.

The example method 700 of FIG. 7A continues when a first view parameter associated with the first functional block is identified (block 704). The example method 700 then determines a key process control parameter within the first functional block (block 706). The key process control parameter may be specified by an operator of the process control system 100 and/or may be predefined for the first functional block. The example method 700 then determines a link corresponding to the key process control parameter (block 708). The link may be determined by searching a database of links for a link with an endpoint that includes the key process control parameter within the first functional block. Alternatively, the link may be determined by a reference within and/or associated with the key parameter that identifies the link. Next, the example method 700 identifies a second view parameter associated with the link (block 710).

The example method 700 then determines an intersection within a second functional block (e.g., a parent functional block) referenced by an endpoint of the link (block 712). The intersection corresponds to a process control parameter within the second functional block that is coupled to the key process control parameter within the first functional block via the link. Subsequently, the example method 700 identifies a third view parameter associated within the second functional block (block 714). Next, the example method 700 couples the first view parameter associated with the first functional block and the second view parameter associated with the link to the third view parameter associated with the second functional block (block 716).

The example method 700 then displays a coupled indication at the intersection within the second functional block (block 718). The coupled indication may include a graphical highlighted icon, a graphical depressed button, and/or any other graphical representation of a concealed functional block. Additionally, the example method 700 may display a visual representation of the first functional block to be concealed by displaying text adjacent to the coupled indication. The text may correspond to a name of the first functional block, an identification number corresponding to the first functional block, an identification number or name of the key process control parameter, a status of the key process control parameter, a location of the key process control parameter, and/or a value associated with the key process control parameter.

The example method 700 of FIG. 7B continues when, upon displaying the coupled indication at the intersection within the second functional block, the link is concealed (block 720). The link may be concealed by removing the link from display, removing the link from the visual object diagram, and/or by setting a conceal flag within the second view parameter associated with the link. Next, the example method 700 determines if there are additional process control parameters within the first functional block (block 722). If there are no additional process control parameters within the first functional block, the example method 700 conceals the first functional block (block 724) and ends. The first functional block may be concealed by removing the first functional block from display, removing the first functional block from the visual object diagram, and/or by setting a conceal flag within the first view parameter associated with the first functional block.

However, if there are additional process control parameters within the first functional block (block 722), the example method 700 selects one of the additional process control parameters and determines a second link associated with the selected process control parameter (block 726). The example method 700 then determines if the second link associated with the selected process control parameter references an intersection within the second functional block (block 728). If the link references a functional block other than the second functional block (e.g., a non-parent functional block of the first functional block), the example method 700 then determines if the non-parent functional block is to be concealed (block 730).

If the non-parent functional block is not to be concealed, the example method 700 couples the second link to a second intersection of the second functional block (block 732). The second intersection may be the same as the intersection that coupled the link from the first functional block or, alternatively, the second intersection may correspond to a different process control parameter within the second functional block. By coupling the second link to the second intersection, the example method 700 displays a link between the non-concealed non-parent functional block and the second functional block. In some example implementations, the method 700 may couple the second link to the second intersection by coupling a view parameter associated with the link to the second intersection. Additionally, the example method 700 displays a coupled indication at the second intersection (block 734). The example method 700 then determines if there are any additional process control parameters within the first functional block that have not been processed by the example method 700 (block 722).

If the second link associated with the selected process control parameter within the first functional block references an intersection within the second functional block (block 728), the example method 700 couples a view parameter associated with the second link to the third view parameter associated with the second functional block (block 736). The example method 700 then displays a coupled indication at the corresponding intersection within the second functional block (block 738) and conceals the link (block 740). The example method 700 continues in FIG. 7B by determining if there are any additional process control parameters within the first functional block that have not been processed by the example method 700 (block 722).

If the non-parent functional block is to be concealed (block 730), the example method 700 couples a view parameter associated with the non-parent functional block to the third view parameter associated with the second functional block (block 742). The example method 700 then displays a coupled indication at a corresponding intersection within the second function (block 744) and conceals the second link and the non-parent functional block (block 746).

Additionally, the method 700 may determine if there are any additional process control parameters and corresponding links within the non-parent functional block. If there are additional process control parameters, the method 700 may continue in a hierarchical process to determine which other functional blocks and associated links should be concealed. Upon concealing the non-parent functional block and any other functional blocks linked to the non-parent functional block, the example method 700 continues in FIG. 7B by determining if there are any additional process control parameters within the first functional block that have not been processed by the example method 700 (block 722). If there are no additional process control parameters within the first functional block, the example method 700 conceals the first functional block (block 724) and ends.

Figure 8:
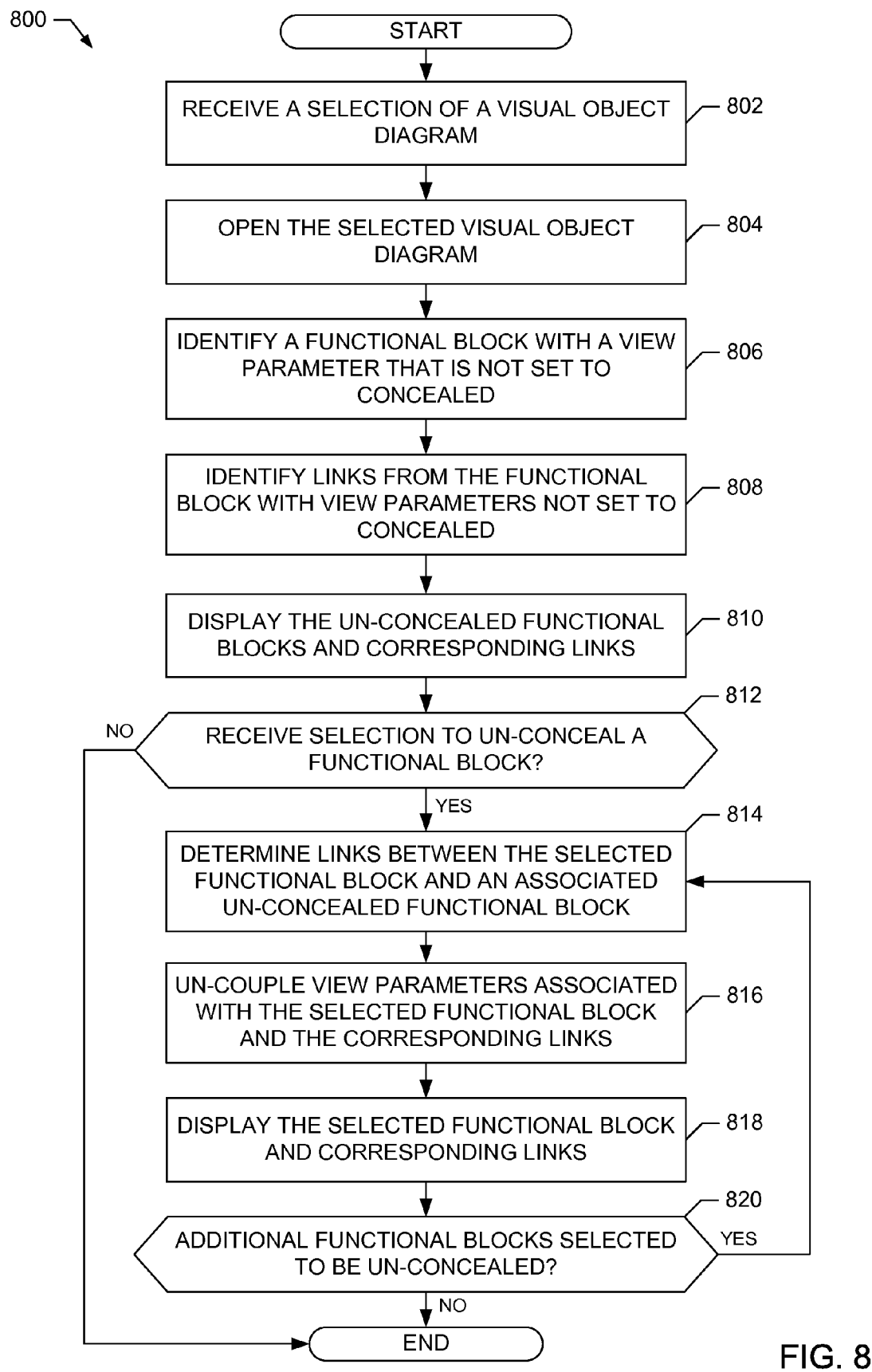

The example method 800 of FIG. 8 un-conceals portions of the visual object diagram 103 within the process control system 100 of FIG. 1. Other example methods 800 may be implemented to un-conceal other functional blocks in other sections of the visual object diagram 103 or, alternatively, may be implemented to un-conceal functional blocks in other visual object diagrams. Additionally, multiple example methods 800 may be executed in parallel or series as functional blocks within visual object diagrams (e.g., the visual object diagram 103) are subsequently selected to be un-concealed.

The example method 800 of FIG. 8 begins when a selection is received of a visual object diagram (e.g., the visual object diagram 103 of FIG. 1) (block 802). The example method 800 then opens the selected visual object diagram (block 804). The method 800 may open the selected visual object diagram within a display of a workstation (e.g., the workstation 104). Additionally, by opening the visual object diagram, the example method 800 displays functional blocks and corresponding links that have not been specified to be concealed.

The example method 800 continues by identifying functional blocks (e.g., parent functional blocks and/or non-parent functional blocks in a hierarchical visual object diagram structure) with a view parameter not set to conceal (block 806). The example method 800 then identifies links corresponding to the functional blocks that are associated with view parameters that are not set to conceal (block 808). Next, the example method 800 displays the functional blocks and/or links associated with view parameters that are not set to conceal (block 810). The example method 800 may identify links and/or functional blocks that are not set to conceal by checking the status of a conceal flag and/or a conceal field within the associated view parameters.

The example method 800 then determines if it has received a selection of functional blocks to un-conceal (block 812). The example method 800 ends if there are zero selected functional blocks to un-conceal any functional blocks. However, if the example method 800 receives a selection of at least one functional block to un-conceal (block 812), the method 800 determines (e.g., identifies) links between the selected functional block to un-conceal and a communicatively coupled un-concealed first functional block (e.g., a parent functional block) (block 814). The example method 800 may receive a selection to un-conceal one or more functional blocks from an operator selecting an intersection within the first functional block to display one or more indications corresponding to concealed functional blocks associated with the intersection. The operator may then select an indication of a concealed functional block to un-conceal that functional block.

Upon determining links associated with a functional block selected to be un-concealed, the example method 800 uncouples view parameters associated with the selected functional block and/or the corresponding links from a view parameter associated with the first functional block (block 816). The example method 800 then displays the selected functional block and/or the corresponding links (block 818). The corresponding links may include links between the selected functional block and the first functional block.

Next, the example method 800 determines if there are additional functional blocks that have been selected to be un-concealed (block 820). If there is at least one additional functional block that has been selected to be un-concealed that has not already been un-concealed, the example method 800 determines links between the selected functional block to un-conceal and a communicatively coupled un-concealed functional block (block 814). However, if there are no additional functional blocks to un-conceal (block 820), the example method 800 ends.

Figure 9:
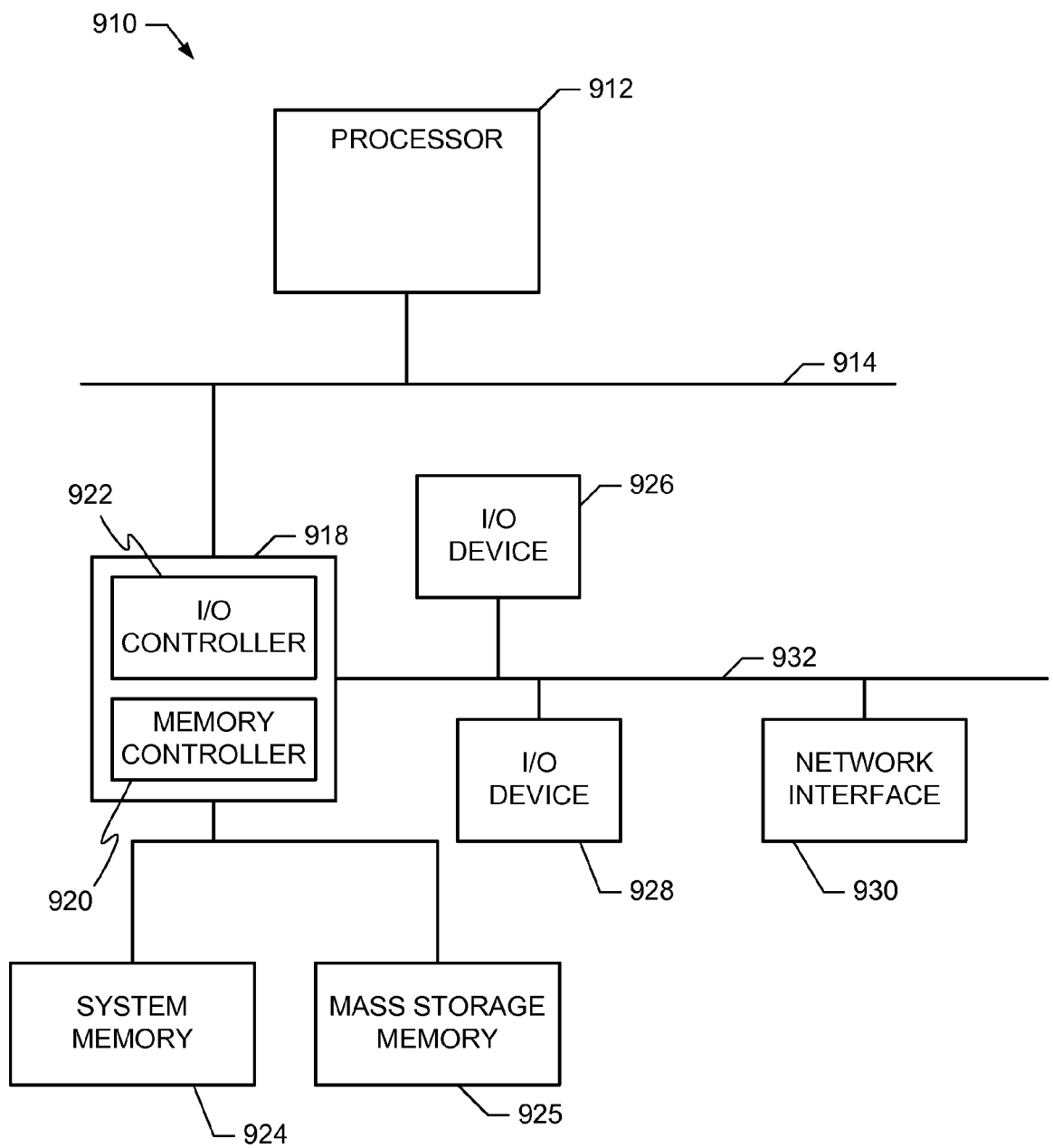
FIG. 9 is a block diagram of an example processor system that may be used to implement the example methods and apparatus described herein.

FIG. 9 is a block diagram of an example processor system 910 that may be used to implement the example methods and apparatus described herein. For example, processor systems similar or identical to the example processor system 910 may be used to implement the example process control algorithm processor 102, the example visual object diagram processor 204, the example process control processor 206, the example functional block manager 208, and/or the example view parameter manager 210 of FIG. 1 and/or 2. Although the example processor system 910 is described below as including a plurality of peripherals, interfaces, chips, memories, etc., one or more of those elements may be omitted from other example processor systems used to implement one or more of the example process control algorithm processor 102, the example visual object diagram processor 204, the example process control processor 206, the example functional block manager 208, and/or the example view parameter manager 210.

As shown in FIG. 9, the processor system 910 includes a processor 912 that is coupled to an interconnection bus 914. The processor 912 includes a register set or register space 916, which is depicted in FIG. 9 as being entirely on-chip, but which could alternatively be located entirely or partially off-chip and directly coupled to the processor 912 via dedicated electrical connections and/or via the interconnection bus 914. The processor 912 may be any suitable processor, processing unit or microprocessor. Although not shown in FIG. 9, the system 910 may be a multi-processor system and, thus, may include one or more additional processors that are identical or similar to the processor 912 and that are communicatively coupled to the interconnection bus 914.

The processor 912 of FIG. 9 is coupled to a chipset 918, which includes a memory controller 920 and a peripheral input/output (I/O) controller 922. As is well known, a chipset typically provides I/O and memory management functions as well as a plurality of general purpose and/or special purpose registers, timers, etc. that are accessible or used by one or more processors coupled to the chipset 918. The memory controller 920 performs functions that enable the processor 912 (or processors if there are multiple processors) to access a system memory 924 and a mass storage memory 925.

The system memory 924 may include any desired type of volatile and/or non-volatile memory such as, for example, static random access memory (SRAM), dynamic random access memory (DRAM), flash memory, read-only memory (ROM), etc. The mass storage memory 925 may include any desired type of mass storage device. For example, if the example processor system 910 is used to implement the process control algorithm processor 102 (FIG. 2), the mass storage memory 925 may include a hard disk drive, an optical drive, a tape storage device, etc. Alternatively, if the example processor system 910 is used to implement the functional block database 205, the memory 220, the data parameter memory 222, and/or the view parameter memory 224, the mass storage memory 925 may include a solid-state memory (e.g., a flash memory, a RAM memory, etc.), a magnetic memory (e.g., a hard drive), or any other memory suitable for mass storage in the functional block database 205, the memory 220, the data parameter memory 222, and/or the view parameter memory 224.

The peripheral I/O controller 922 performs functions that enable the processor 912 to communicate with peripheral input/output (I/O) devices 926 and 928 and a network interface 930 via a peripheral I/O bus 932. The I/O devices 926 and 928 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The network interface 930 may be, for example, an Ethernet device, an asynchronous transfer mode (ATM) device, an 802.11 device, a DSL modem, a cable modem, a cellular modem, etc. that enables the processor system 910 to communicate with another processor system.

While the memory controller 920 and the I/O controller 922 are depicted in FIG. 9 as separate functional blocks within the chipset 918, the functions performed by these blocks may be integrated within a single semiconductor circuit or may be implemented using two or more separate integrated circuits.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or systems described herein.

It should also be noted that the example software and/or firmware implementations described herein are stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories. Accordingly, the example software and/or firmware described herein can be stored on a tangible storage medium such as those described above or successor storage media. To the extent the above specification describes example components and functions with reference to particular standards and protocols, it is understood that the scope of this patent is not limited to such standards and protocols. For instance, each of the standards for internet and other packet-switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example methods and apparatus including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example methods, systems, and machine-accessible medium, the examples are not the only way to implement such systems, methods and machine-accessible medium. Therefore, although certain example methods, systems, and machine-accessible medium have been described herein, the scope of coverage of this patent is not limited thereto. On the contrary, this patent covers all methods, systems, and machine-accessible medium fairly falling within the scope of the appended claims either literally or under the doctrine of equivalents.

What is claimed is:

1. A method to conceal portions of visual object diagrams in a process control system, the method comprising:
   receiving a selection to conceal a first functional block displayed within a visual object diagram, wherein the first functional block is associated with a first view parameter;
   determining a link displayed within the visual object diagram from a process control parameter within the first functional block to a first intersection displayed within a second functional block displayed within the visual object diagram, wherein the link is associated with a second view parameter;
   coupling the first view parameter and the second view parameter to the first intersection; and
   concealing the link and the first functional block.

2. A method as defined in claim 1, further comprising:
   displaying an indication within the second functional block at the first intersection to indicate that the first functional block is concealed; and
   displaying a visual representation of at least one of the process control parameter or the first functional block adjacent to the indication.

3. A method as defined in claim 2, wherein the visual representation includes at least one of a value of the process control parameter, a name of the process control parameter, a status of the process control parameter, an identification number of the process control parameter, a location of the process control parameter, a name of the first functional block, or an identification number of the first functional block.

4. A method as defined in claim 1, wherein the link is determined by identifying that the process control parameter within the first functional block corresponds to a specified key process control parameter.

5. A method as defined in claim 4, wherein the key process control parameter is specified to couple to the second functional block.

6. A method as defined in claim 1, wherein coupling the first view parameter and the second view parameter to the first intersection includes coupling the first view parameter and the second view parameter to a third view parameter associated with the second functional block.

7. A method as defined in claim 1, wherein the first view parameter is associated with a first data parameter corresponding to the first functional block and the second view parameter is associated with a second data parameter corresponding to the link.

8. A method as defined in claim 1, further comprising storing an indication within the first view parameter that the first functional block is concealed and storing an indication within the second view parameter that the link is concealed.

9. A method as defined in claim 1, further comprising:
   determining if there is a second link from a second intersection within the first functional block to a second process control parameter within a third functional block; and
   determining if the third functional block is to be concealed.

10. A method as defined in claim 9, further comprising:
    coupling a third view parameter corresponding to the second link to the second intersection;
    coupling the second intersection to the first intersection;
    if the third functional block is to be concealed, coupling a fourth view parameter corresponding to the third functional block to the second intersection and concealing the second link and the third functional block; and
    if the third functional block is not to be concealed, displaying the second link coupled to an indication at the first intersection.

11. A method as defined in claim 1, further comprising:
    determining a second link from a second process control parameter within the first functional block to a second intersection within the second functional block, wherein the second link is associated with a third view parameter;
    coupling the third view parameter to the first intersection;
    concealing the second link;
    displaying an indication within the second functional block at the first intersection; and
    displaying a visual representation of at least one of the second process control parameter or the first functional block adjacent to the indication.

12. A method as defined in claim 1, further comprising:
    determining if the second functional block is to be concealed, wherein the second functional block is associated with a third view parameter;
    determining a second link from a second process control parameter within the second functional block to a second intersection within a third functional block within the visual object diagram, wherein the second link is associated with a fourth view parameter;
    coupling the third view parameter and the fourth view parameter to the second intersection; and
    concealing the second link and the second functional block.

13. A method as defined in claim 12, further comprising:
    displaying an indication within the third functional block at the second intersection; and
    displaying a visual representation of at least one of the second process control parameter or the second functional block adjacent to the indication.

14. A method as defined in claim 1, further comprising closing the visual object diagram and concealing the first functional block and the link when the visual object diagram is reopened.

15. A method as defined in claim 1, wherein concealing the first functional block and the link includes at least one of removing the first functional block and the link from display, removing the first functional block and the link from the visual object diagram, or setting a conceal flag within the first view parameter associated with the first functional block and a conceal flag within the second view parameter associated with the link.

16. An apparatus to conceal portions of visual object diagrams in a process control system, the apparatus comprising:
    a functional block manager to:
      determine a link displayed from a process control parameter within a first functional block selected to be concealed to a first intersection displayed within a second functional block displayed within a visual object diagram, wherein the first functional block is associated with a first view parameter, and the link is associated with a second view parameter; and
      conceal the link and the first functional block;
    a view parameter manager to couple the first view parameter and the second view parameter to the first intersection; and a processor to implement at least one of the functional block manager or the view parameter manager.

17. An apparatus as defined in claim 16, further comprising an input receiver to:
   receive a selection to conceal the first functional block within the visual object diagram; and
   forward the received selection of the first functional block to the functional block manager.

18. An apparatus as defined in claim 16, wherein the functional block manager determines the link by identifying that the process control parameter within the first functional block corresponds to a specified key process control parameter.

19. An apparatus as defined in claim 16, wherein the view parameter manager couples the first view parameter and the second view parameter to the first intersection by coupling the first view parameter and the second view parameter to a third view parameter associated with the second functional block.

20. An apparatus as defined in claim 16, wherein the view parameter manager is to store an indication within the first view parameter that the first functional block is to be concealed and is to store an indication within the second view parameter that the link is to be concealed.

21. An apparatus as defined in claim 16, further comprising a visual object displayer to:
   display an indication within the second functional block at the first intersection;
   display a visual representation of at least one of the process control parameter or the first functional block adjacent to the indication;
   conceal the first functional block and the link by not displaying the first functional block and the link when the visual object diagram is reopened.

22. An apparatus as defined in claim 16, wherein the functional block manager is to:
   determine if there is a second link from a second intersection within the first functional block to a second process control parameter within a third functional block;
   determine if the third functional block is to be concealed; and
   if the third functional block is to be concealed, conceal the second link and the third functional block.

23. An apparatus as defined in claim 22, wherein the view parameter manager is to:
   couple a third view parameter corresponding to the second link to the second intersection;
   couple the second intersection to the first intersection;
   if the third functional block is to be concealed, couple a fourth view parameter associated with the third functional block to the second intersection; and
   if the third functional block is not to be concealed, couple the second link to an indication at the first intersection.

24. An apparatus as defined in claim 16, wherein the functional block manager is to:
   determine if the second functional block is to be concealed, wherein the second functional block is associated with a third view parameter;
   determine a second link from a second process control parameter within the second functional block to a second intersection within a third functional block within the visual object diagram, wherein the second link is associated with a fourth view parameter; and
   conceal the second link and the second functional block.

25. A non-transitory machine readable storage medium having instructions stored thereon that, when executed, cause a machine to at least:
   receive a selection to conceal a first functional block displayed within a visual object diagram, wherein the first functional block is associated with a first view parameter;
   determine a link displayed from a process control parameter within the first functional block to a first intersection within a second functional block displayed within the visual object diagram, wherein the link is associated with a second view parameter;
   couple the first view parameter and the second view parameter to the first intersection; and
   conceal the link and the first functional block.

* * * * *